(12) United States Patent
Manepalli et al.

(10) Patent No.: US 10,412,780 B2
(45) Date of Patent: Sep. 10, 2019

(54) ADAPTING DISCONTINUOUS RECEPTION CYCLES USING SCHEDULING REQUESTS

(71) Applicant: Apple Inc., Cupertino, CA (US)

(72) Inventors: Venkateswara Rao Manepalli, Sunnyvale, CA (US); Abhishek A. Bhonsle, San Jose, CA (US); Raghuveer Mallikarjunan, Sunnyvale, CA (US); Sarma V. Vangala, San Jose, CA (US); Srinivas Burugupalli, Union City, CA (US)

(73) Assignee: Apple Inc., Cupertino, CA (US)

( * ) Notice: Subject to any disclaimer, the term of this patent is extended or adjusted under 35 U.S.C. 154(b) by 156 days.

(21) Appl. No.: 15/604,799

(22) Filed: May 25, 2017

(65) Prior Publication Data

US 2018/0343686 A1    Nov. 29, 2018

(51) Int. Cl.
*H04W 76/28* (2018.01)
*H04W 72/12* (2009.01)
*H04W 76/38* (2018.01)
*H04W 52/02* (2009.01)

(52) U.S. Cl.
CPC ....... *H04W 76/28* (2018.02); *H04W 52/0216* (2013.01); *H04W 76/38* (2018.02); *H04W 72/12* (2013.01)

(58) Field of Classification Search
CPC . H04W 76/28; H04W 76/38; H04W 72/1284; H04W 72/1289; H04W 72/14; H04W 88/02; H04M 7/006
See application file for complete search history.

(56) References Cited

U.S. PATENT DOCUMENTS

| | | | | |
|---|---|---|---|---|
| 8,582,483 | B1* | 11/2013 | Yu | H04W 52/0216 370/311 |
| 9,107,197 | B2* | 8/2015 | Willars | H04W 76/20 |
| 9,497,771 | B2 | 11/2016 | Vangala et al. | |
| 2012/0207069 | A1* | 8/2012 | Xu | H04W 52/0222 370/311 |
| 2015/0365995 | A1* | 12/2015 | Tabet | H04W 76/28 370/311 |
| 2018/0070404 | A1* | 3/2018 | Giguet | H04W 72/1257 |
| 2018/0227856 | A1* | 8/2018 | Yang | H04W 52/0274 |

* cited by examiner

*Primary Examiner* — Charles C Jiang
*Assistant Examiner* — Ryan C Kavleski
(74) *Attorney, Agent, or Firm* — Meyertons Hood Kivlin Kowert and Goetzel PC; Jeffrey C. Hood

(57) ABSTRACT

Method and apparatus of a user equipment (UE) device communicating during discontinuous reception (DRX). The UE may determine a data traffic pattern of an application executing on the UE. The UE may compare the data traffic pattern against a plurality of DRX configuration settings of a base station (BS). The UE may determine that the DRX configuration settings do not match the data traffic pattern. The UE may select a first DRX configuration setting based on the data traffic pattern. The UE may perform communication according to the first DRX configuration settings. The UE may transmit a scheduling request (SR) outside of a DRX on-duration according to the data traffic pattern. Transmitting the SR may be based on the DRX configuration settings not matching the data traffic pattern of the application. In response to transmitting the SR, the UE may receive downlink data of the application from the BS.

20 Claims, 14 Drawing Sheets

ADAPTING DISCONTINUOUS RECEPTION CYCLES USING SCHEDULING REQUESTS

FIELD

The present application relates to wireless devices, including to apparatuses, systems and methods for adapting discontinuous reception cycles using scheduling requests.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Cellular communication technologies may be capable of providing a variety of services, and may be used by a variety of applications. Different applications utilizing cellular communication may have different characteristics. Cellular communication techniques which do not take into account the different application characteristics of the various applications utilizing cellular communication may be in danger of operating inefficiently. Accordingly, improvements in the field would be desirable.

SUMMARY

Embodiments are presented herein of apparatuses, systems, and methods for adapting discontinuous reception (DRX) cycles using scheduling requests.

A UE may determine a data traffic pattern of an application executing on the UE. Generally, some applications may have predictable or well-understood data traffic flows. For example, a voice over IP (VoIP) or streaming applications may have a well-defined data traffic pattern, e.g., where application data is transmitted or received at regular intervals or periods, e.g., having a period length of 60 ms.

Upon determining the data traffic pattern of an application, the UE may compare the data traffic pattern of the application against a plurality of discontinuous reception (DRX) configuration settings which are associated with a base station (BS) in communication with the UE. For example, each of the DRX configurations may specify at least a DRX cycle length, which may specify the length of an entire DRX cycle, including the on duration and off duration. For example, the DRX configuration settings may have a default DRX configuration setting for data applications having a cycle length of 320 ms and an inactivity timer of 200 ms (or 320/200 in shorthand). In one embodiment, a good match between an application traffic pattern and a DRX configuration setting may involve the period time length and the DRX cycle length having the same (or substantially similar, such as within 5% or 10% of each other) values.

After comparing the data traffic pattern of the application to each of at least a subset (e.g., all) of the available DRX configuration settings, the UE may determine that the DRX configuration setting(s) do not match the data traffic pattern of the application. For example, the UE may execute a VoIP application that has a 60 ms period length, but the closest DRX configuration may have a DRX cycle length of 80 ms.

In the event that none of the available DRX configurations appropriately match the data traffic pattern of the application, the UE may select a first DRX configuration from the plurality of DRX configurations. The UE may perform communication with the BS according to the first DRX configuration settings.

The UE may be configured to modify or otherwise augment the communications according to the first DRX configuration setting by transmitting a scheduling request (SR) outside of the DRX on duration, based on the data traffic pattern of the application. For example, where the UE is aware that data should be transmitted by the UE or received from the network, but there is no on duration at the time of that expected transmission/reception, the UE may be configured to transmit an SR to allow the UE to transmit data to the BS or in order to cause the BS to transmit the expected data to the UE.

The techniques described herein may be implemented in and/or used with a number of different types of devices, including but not limited to cellular phones, cellular base stations, mobile management entities (MMES) and other cellular core network entities, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
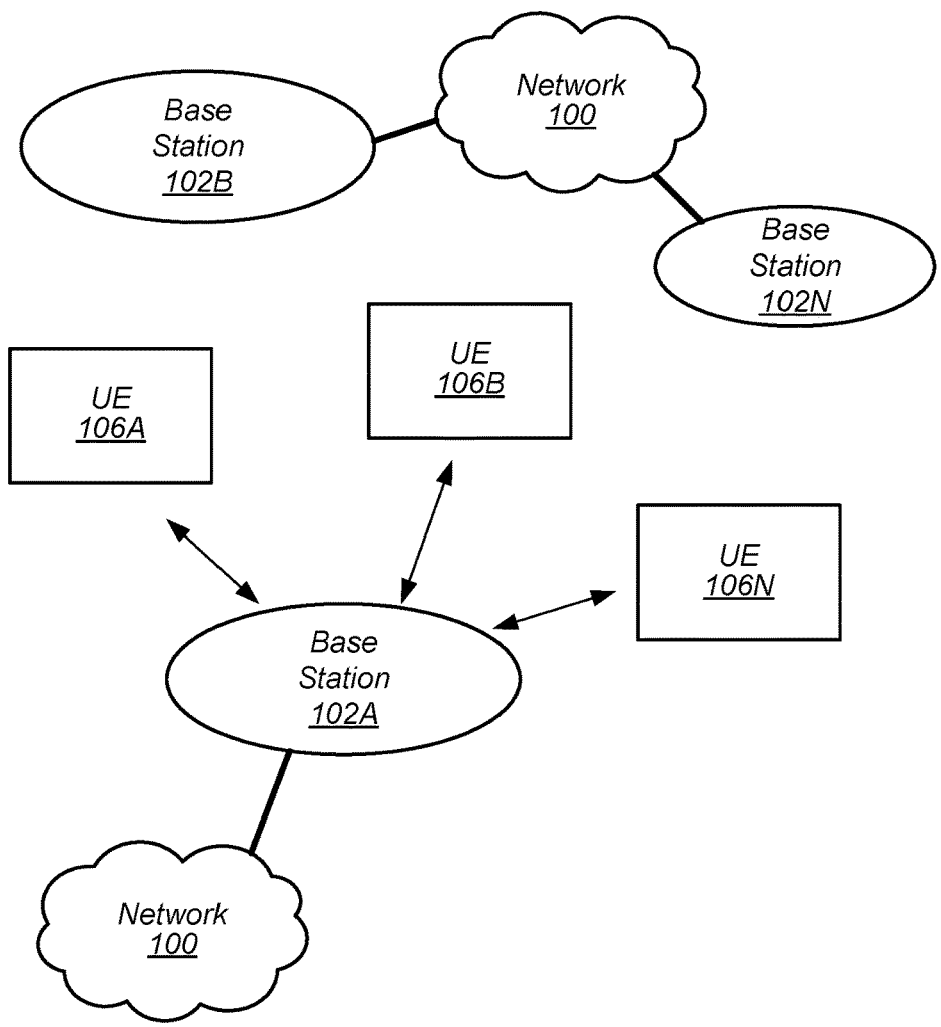
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
GSM: Global System for Mobile Communications
GERAN: GSM EDGE Radio Access Network
UMTS: Universal Mobile Telecommunications System
UTRAN: UMTS Terrestrial Radio Access Network or Universal Terrestrial Radio Access Network
LTE: Long Term Evolution
RAN: Radio Access Network
E-UTRAN: Evolved UMTS Radio Access Network or Evolved Universal Radio Access Network
EPC: Evolved Packet Core
EPS: Evolved Packet Service
MME: Mobility Management Entity
HSS: Home Subscriber Server
AS: Access Stratum
NAS: Non-Access Stratum
RLC: Radio Link Control
RRC: Radio Resource Control
MAC: Media Access Control
IE: Information Element
NW: Network

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
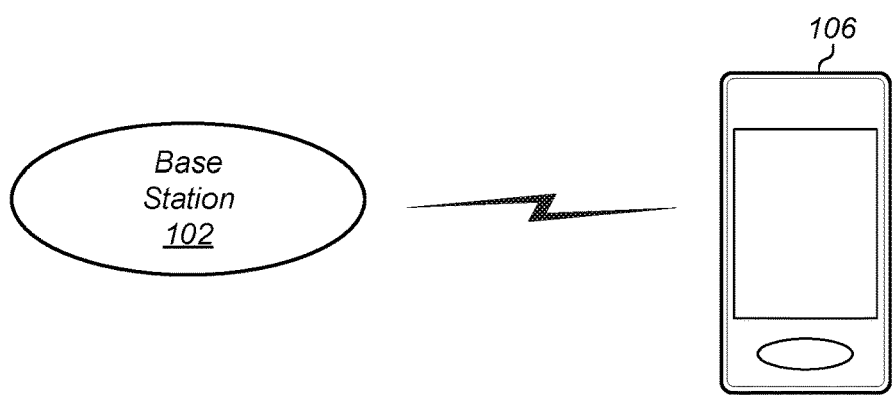
FIG. 2 illustrates a base station (BS) in communication with a user equipment (UE) device, according to some embodiments.
Figure 3:
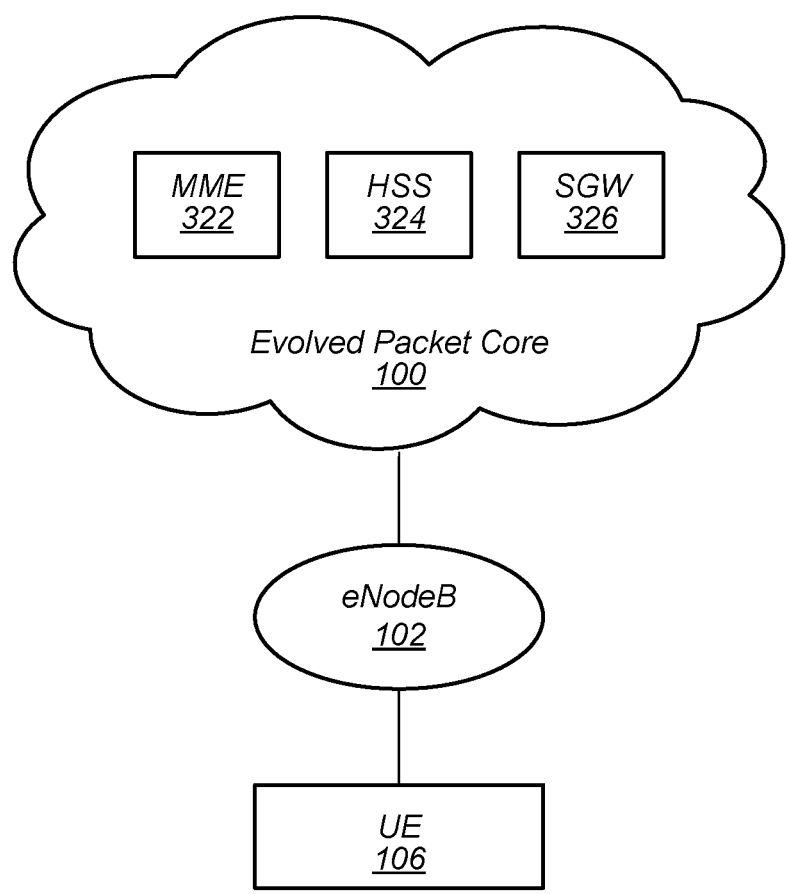
FIG. 3 illustrates an exemplary (and simplified) cellular network architecture, according to some embodiments.

FIGS. 1-3—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), New Radio (NR), 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, NR, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

As noted above, the UE 106 may be configured to communicate using any of multiple RATs. For example, the UE 106 may be configured to communicate using two or more of GSM, CDMA2000, LTE, LTE-A, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE/

NR using a single shared radio and/or GSM or LTE/NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE/NR or 1×RTT (or LTE/NR or GSM), and separate radios for communicating using each of Wi-Fi and Bluetooth. Other configurations are also possible.

FIG. 3 illustrates an exemplary, simplified portion of a wireless communication system, such as a 3GPP compliant cellular network, according to some embodiments.

As shown, a UE 106 may be in communication with a base station, shown in this exemplary embodiment as an eNodeB 102. In turn, the eNodeB may be coupled to a core network, shown in this exemplary embodiment as an evolved packet core (EPC) 100. As shown, the EPC 100 may include mobility management entity (MME) 322, home subscriber server (HSS) 324, and serving gateway (SGW) 326. The EPC 100 may include various other devices and/or entities known to those skilled in the art as well.

Figure 4:
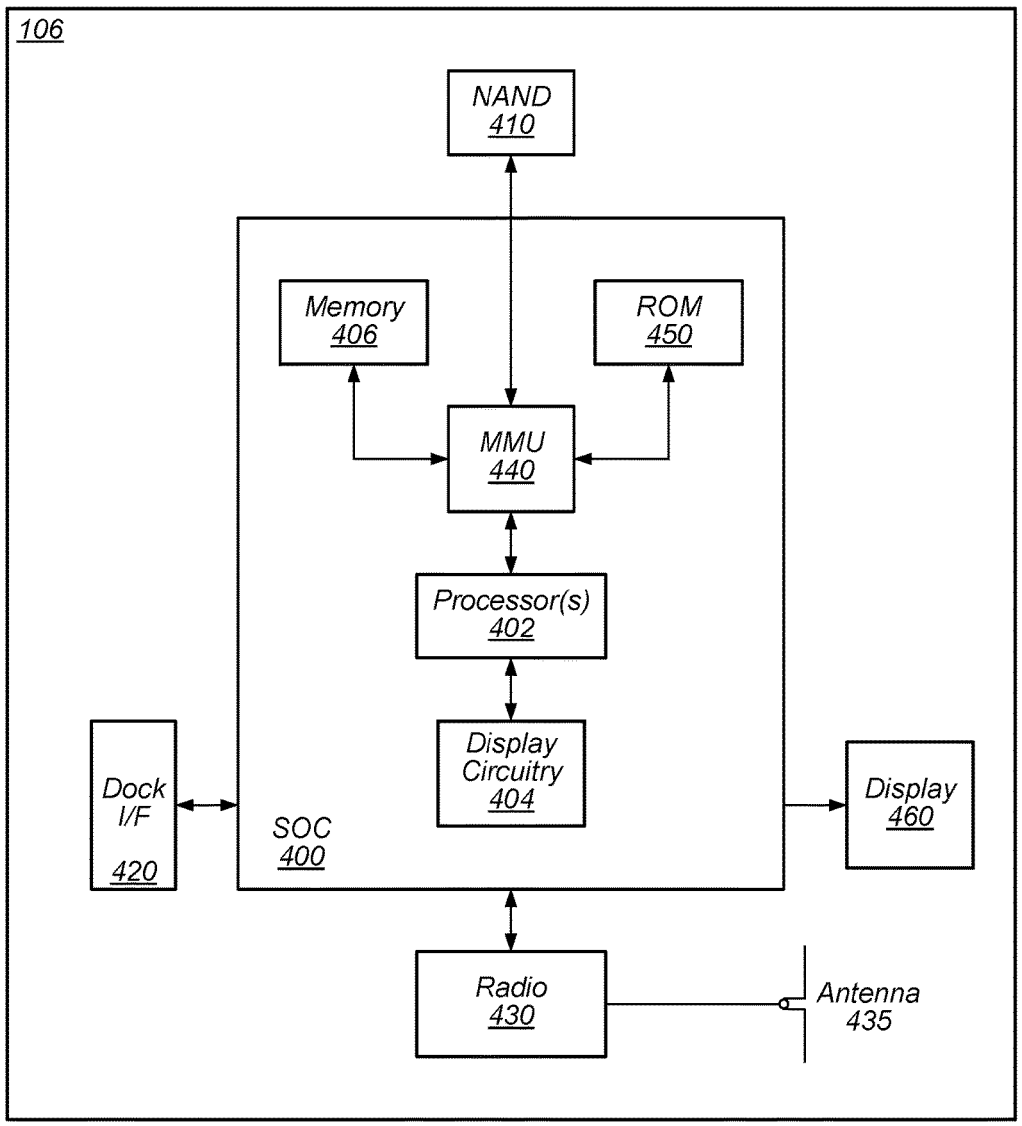
FIG. 4 illustrates an exemplary block diagram of a UE, according to some embodiments.

FIG. 4—Exemplary Block Diagram of a UE

FIG. 4 illustrates an exemplary block diagram of a UE 106, according to some embodiments. As shown, the UE 106 may include a system on chip (SOC) 400, which may include portions for various purposes. For example, as shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430, connector I/F 420, and/or display 460. The MMU 440 may be configured to perform memory protection and page table translation or set up. In some embodiments, the MMU 440 may be included as a portion of the processor(s) 402.

As also shown, the SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, and wireless communication circuitry 430 (e.g., for LTE, NR, GSM, CDMA2000, Bluetooth, Wi-Fi, etc.).

As noted above, the UE 106 may be configured to communicate wirelessly using multiple wireless communication technologies. As further noted above, in such instances, the wireless communication circuitry 430 may include radio components which are shared between multiple wireless communication technologies and/or radio components which are configured exclusively for use according to a single wireless communication technology. As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna(s) 435 to perform the wireless communication.

As described further subsequently herein, the UE 106 may include hardware and software components for implementing part or all of the methods described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
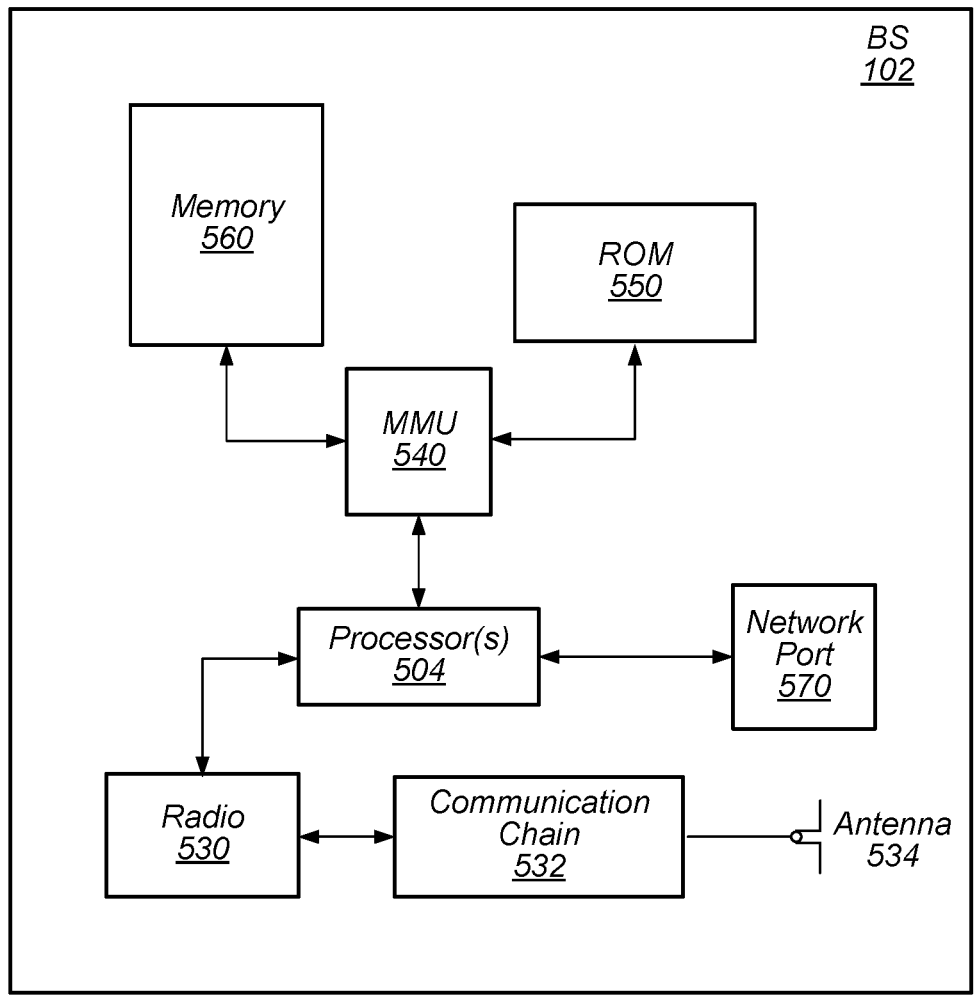
FIG. 5 illustrates an exemplary block diagram of a BS, according to some embodiments.

FIG. 5—Base Station

FIG. 5 illustrates an exemplary block diagram of a base station 102, according to some embodiments. It is noted that the base station of FIG. 5 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices serviced by the cellular service provider).

The base station 102 may include at least one antenna 534, and possibly multiple antennas. The antenna(s) 534 may be configured to operate as a wireless transceiver and may be further configured to communicate with UE devices 106 via radio 530. The antenna(s) 534 communicates with the radio 530 via communication chain 532. Communication chain 532 may be a receive chain, a transmit chain or both. The radio 530 may be configured to communicate via various wireless communication technologies, including, but not limited to, LTE, LTE-A, NR, GSM, WCDMA, CDMA2000, Wi-Fi, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 6:
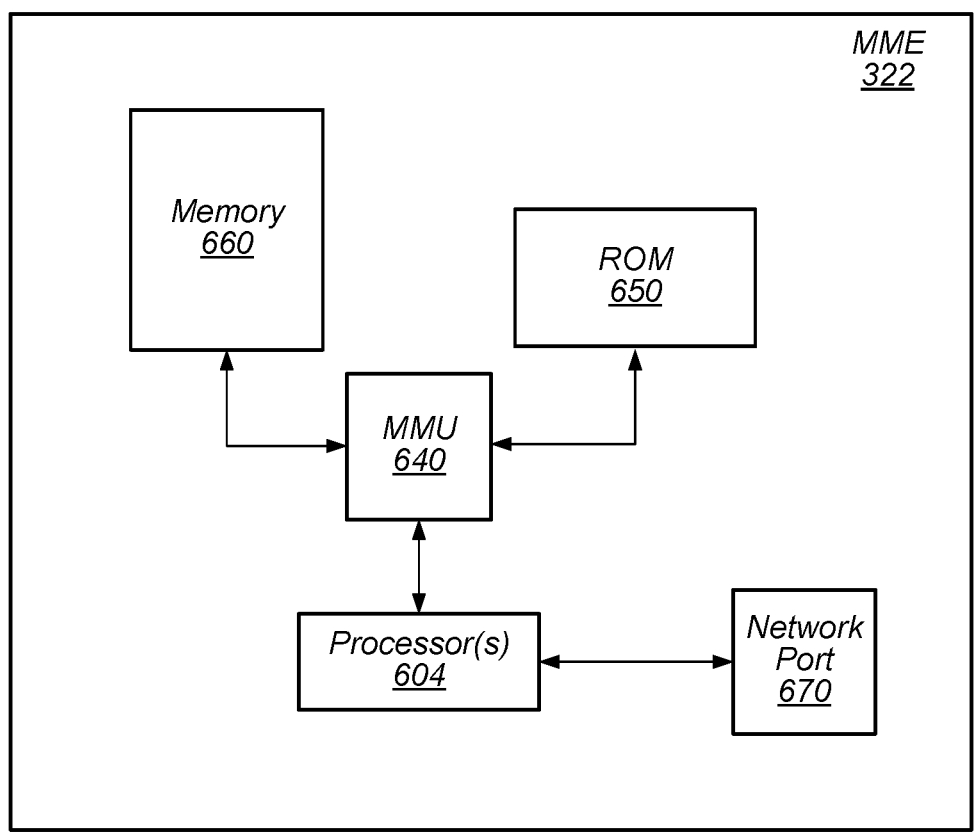
FIG. 6 illustrates an exemplary block diagram of an MME, according to some embodiments.

FIG. 6—Mobility Management Entity

FIG. 6 illustrates an exemplary block diagram of a mobility management entity (MME) 322, according to some embodiments. It is noted that the MME 322 of FIG. 6 is merely one example of a possible MME 322. As shown, the MME 322 may include processor(s) 604 which may execute program instructions for the MME 322. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The MME 322 may include at least one network port 670. The network port 670 may be configured to couple to one or more base stations and/or other cellular core network entities and/or devices.

The MME 322 may provide mobility related services to a plurality of devices, such as UE devices 106. For example, the MME 322 may be responsible for registering UE devices which attempt to perform an attach procedure, a tracking area update procedure, and/or any of various other procedures.

The MME 322 may communicate with base stations (e.g., eNBs) and/or other core network entities/devices by means of any of various communication protocols and/or interfaces. As one example, in a 3GPP context, the MME 322 may use any of an S1-MME, S3, S10, S11, Sha, and/or any of various other communication protocols or interfaces to communicate with other cellular network components.

The processor(s) 604 of the MME 322 may be configured to implement part or all of the methods described herein, e.g., by executing program instructions stored on a memory medium (e.g., a non-transitory computer-readable memory medium). Alternatively, the processor 604 may be configured as a programmable hardware element, such as an FPGA (Field Programmable Gate Array), or as an ASIC (Application Specific Integrated Circuit), or a combination thereof.

In LTE/NR, a UE may be able to operate in one of the two modes, an idle mode and a connected mode. In the idle mode, Discontinuous Reception (DRX) allows the UE to switch off its radio receiver and thereby reduce its power consumption. At least in some embodiments, it may be the case that a UE enters the idle mode upon receiving a Radio Resource Control (RRC) connection release message from the network. In the connected mode a UE can be in active data transmission or in a connected DRX mode. The connected mode DRX pattern may, for example, be used by the UE if configured by the network, and may follow a defined pattern of on and off cycles. DRX can be configured using any of a variety of settings, and at least in some instances multiple DRX modes (e.g., a short DRX or a long DRX) may be configured as desired.

In at least some cellular communication systems (for example, LTE or NR) there may exist a mechanism by use of which the UE may be able to communicate to the network whether the UE prefers a 'power optimized' configuration or a 'normal' configuration. This indicator may be referred to as a Power Performance Indication (PPI), at least in some instances. When UE sends an indication to the network (NW) setting its preference for the power optimized configuration, the NW may optimize the connected mode configuration, such as DRX configuration, and/or move the UE to idle mode, among various possibilities. At least in some instances, the details on when and how to set this indication may be specified according to UE implementation. Similarly, the NW response to such an indication may also depend on network implementation. At least some of the below described embodiments of the disclosure relate to possible uses for such a PPI in wireless communication systems.

Figure 7:
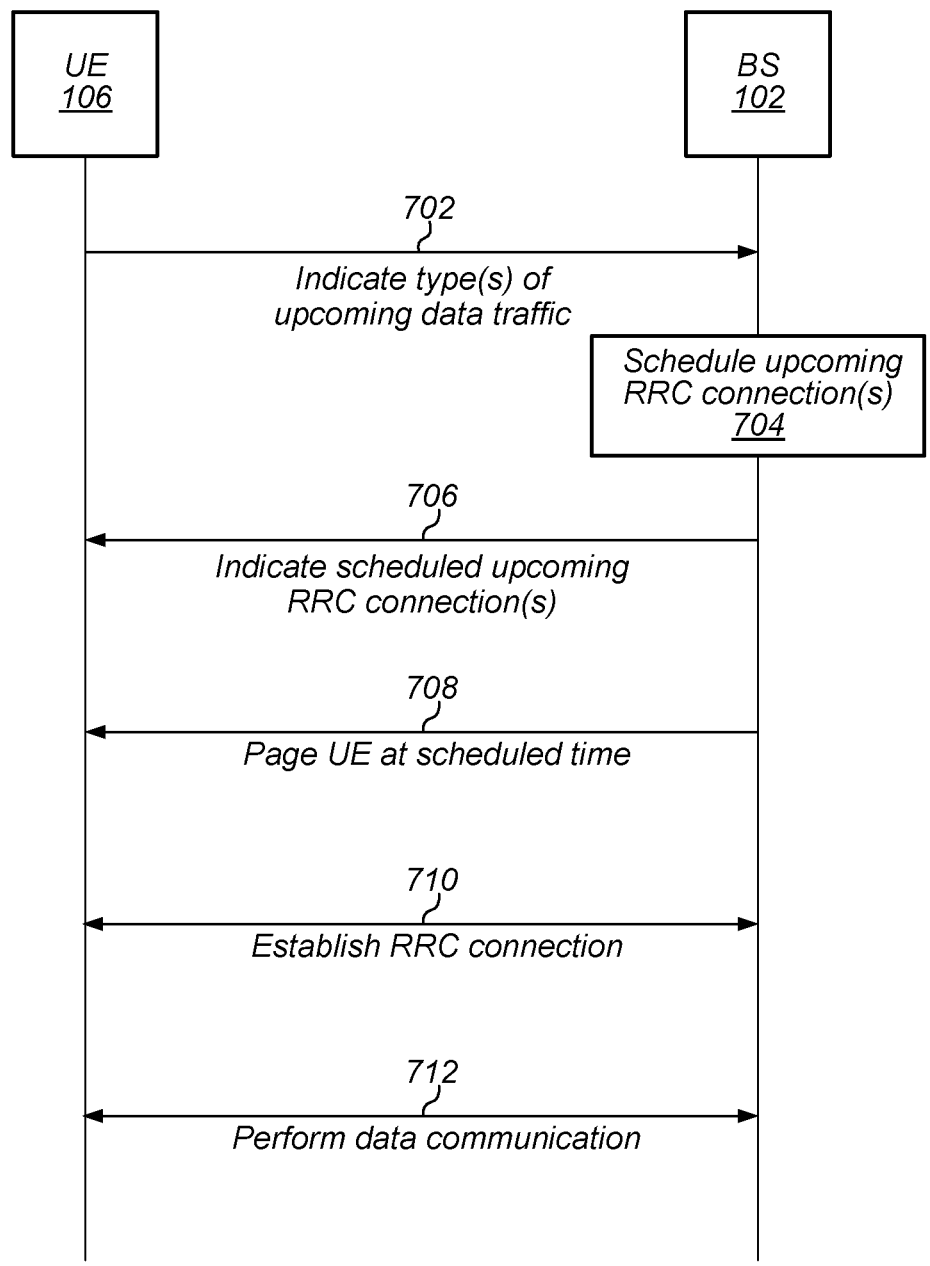
FIG. 7 is a communication flow diagram illustrating an exemplary method for establishing deterministic RRC connections based on data traffic characteristics, according to some embodiments.

FIG. 7—Communication Flow Diagram

FIG. 7 is a communication/signal flow diagram illustrating a scheme for deterministically setting up RRC connections between wireless devices and base stations in a manner that accounts for data traffic characteristics, according to some embodiments. The scheme shown in FIG. 7 may be used in conjunction with any of the computer systems or devices shown in the above Figures, among other devices. In various embodiments, some of the elements of the scheme shown may be performed concurrently, in a different order than shown, or may be omitted. Additional elements may also be performed as desired. As shown, the scheme may operate as follows.

In 702, a UE 106 may transmit an indication of one or more types of expected upcoming data traffic (e.g., uplink traffic, and/or downlink traffic) to a (e.g., serving) base station 102 or MME/(S/P)GW. The UE 106 may monitor application data already generated, buffered, and ready for transmission to determine the expected upcoming data traffic, according to some embodiments. Additionally or alternatively, the UE 106 may monitor application data generation and/or application data flow patterns to predict if one or more types of data traffic will be generated and ready for transmission within a certain time period. Other techniques for determining if one or more types of data traffic are expected by the UE 106 are also possible.

The indication may explicitly include information regarding characteristics of the upcoming data traffic. For example, certain characteristics such as expected bandwidth, priority level, delay budget/tolerance, application or application type, etc. may be indicated for each kind of upcoming data traffic included in the indication. One or more link characteristics (e.g., appropriate characteristics of a radio resource control (RRC) connection to be used to communicate the upcoming data traffic), such as scheduling request (SR) or channel state information frequency/periodicity, idle mode discontinuous reception (I-DRX) or connected mode DRX (C-DRX) configuration preferences, RRC inactivity timer preferences, etc., may also or alternatively be indicated.

Alternatively, or in addition, the indication may implicitly include information regarding some or all such characteristics of the upcoming data traffic. For example, different 'classes' of data traffic (e.g., similar or different to typical 'Quality of Service' or 'QoS' data classes) may be defined as each having a set of some or all of such characteristics and/or any of various other characteristics. For example, a table defining 'RAN QoS' or 'RQoS' (or 'Application QoS' or 'AQoS' if preferred) classes and parameters may be used, such as the following table:

| P1 | P2 | ... | PN |
|----|----|-----|----|
| C1 | | | |
| C2 | | | |
| ... | | | |
| CN | | | |

In this exemplary table, C1-CN may represent classes of data traffic or application classes, while P1-PN may represent parameters for which values may be specified for each class in the table to define the characteristics of that class. Thus, if such a table were in use, the indication might specify the RQoS class(es) of the upcoming data traffic, and thus implicitly include information regarding some or all characteristics or configuration preferences rather than explicitly providing such information in the indication.

Note that, at least in some instances, the UE 106 may dynamically determine the class, priority, or other characteristics of different types of data traffic (e.g., corresponding to different types of application data) based at least in part on monitoring application traffic patterns of user data of the UE 106. For example, the UE 106, may be able to analyze user patterns to determine which applications are and are not priorities for a given user. Based on such a determination, application data corresponding to a particular application might be assigned to different classes at different UEs, e.g., depending on the user traffic patterns of those different UEs. Likewise, user data patterns may change over time, and so determination by a UE 106 of which class, priority, etc. application data of a particular application belongs to may be different at different times, at least in some embodiments.

Note additionally that, if desired, the indication may identify multiple types of upcoming traffic (e.g., if multiple applications are active at the UE 106), at least in some instances.

The BS 102 may receive the indication from the UE 106 and may possibly also receive indications of upcoming data traffic types from multiple other UEs. In 704, the BS 102 may schedule upcoming RRC connections for the UE 106 (and possibly any other UEs served by the BS 102). Scheduling the upcoming RRC connections may take into consideration the characteristics (e.g., expected bandwidth and delay budget, etc.) of the upcoming data traffic for each UE served by the BS 102, while also taking into consideration the current and/or upcoming expected loading of the BS 102, and the current schedule of the BS 102. The upcoming RRC connections may be scheduled based on such considerations in such a manner as to attempt to optimize one or more network characteristics. For example, as one possibility, the BS 102 may attempt to schedule the upcoming RRC connections in such a manner as to smooth the loading of the BS 102 over time, which may improve network performance, while also attempting to meet the delay requirements of the data traffic of each of the UEs. The upcoming RRC connection scheduling may additionally or alternatively consider any of various other attempted optimizations and/or constraints.

In 706, the BS 102 may transmit an indication of scheduled upcoming RRC connection(s) to the UE 106. Note that the BS 102 may possibly also transmit indications of scheduled upcoming RRC connections to any other UEs for which upcoming RRC connections were scheduled. Each indication may inform a UE of timing of one or more upcoming RRC connections, and possibly also the type(s) (e.g., class(es)) of traffic to be communicated at that time. Note that the indication of timing of a scheduled RRC connection may be according to a system time (e.g., may specify a radio frame/subframe number or range of the scheduled RRC connection) of a wireless communication system in which the BS 102 and the UE 106 are communicating, as one possibility, or may use any of various other possible timing paradigms.

In some instances, the BS 102 may further indicate one or more characteristics of a scheduled upcoming RRC connection to a UE 106. For example, any or all of scheduling request frequency/periodicity, channel state information reporting frequency/periodicity, semi-persistent scheduling configuration, power settings (such as IDRX/CDRX configurations, fast dormancy options, RRC inactivity timer options, etc.), etc., for a scheduled upcoming RRC connection may be indicated to a UE 106 in addition to timing information for the scheduled upcoming RRC connection, if desired. Alternatively, certain RRC connection characteristics may be associated (e.g., by mutual exchange between the UE 106 and the BS 102 or other network elements, or in a statically/predetermined manner such as according to specification documents) with certain data traffic types or classes, such that indication of a type of data traffic associated with a particular scheduled upcoming RRC connection may implicitly indicate some or all of the characteristics of that scheduled upcoming RRC connection.

In some instances, the UE 106 may set a (e.g., baseband) sleep schedule based on receiving such an indication. For example, the baseband operations of the UE 106 may enter (or remain in) a low power (sleep) state (with possible interruptions for on-duration activities such as cell measurements and/or monitoring a paging channel) until the time at which the RRC connection is scheduled.

At the scheduled time, the UE 106 may wake up and 'listen' (e.g., monitor a paging channel) for pages from the BS 102. In 708, the BS 102 may page the UE (e.g., provide a paging message on the paging channel).

In 710, the UE 106 and the BS 102 may establish an RRC connection. This may be performed at the scheduled time and based on the UE 106 receiving the paging message from the BS 102. For example, the UE 106 may respond to the paging message and exchange RRC connection establishment parameters with the BS 102 to establish the scheduled RRC connection. In other words, at least in some embodiments, the scheduled RRC connection may be established in a network initiated manner, e.g., as opposed to requiring the UE 106 to perform a random access request (RACH) procedure in order to establish the RRC connection and enter a RRC connected mode. Alternatively, the scheduled RRC connection may be established in a UE initiated manner if desired. Note that if any characteristics of the scheduled RRC connection were pre-arranged (e.g., if the BS 102 explicitly or implicitly indicated certain RRC connection characteristics when scheduling the RRC connection), the RRC connection may be established in accordance with those pre-arranged characteristics, at least in some embodiments.

In 712, the UE 106 and the BS 102 may perform data communication over the established RRC connection. This may include the UE 106 transmitting (uplink) data of a type which was originally indicated in the indication provided in step 702 and which was specified by the BS 102 for this particular RRC connection in the indication provided in step 706. At least in some instances, the UE 106 may also receive (downlink) data from the BS 102 via the RRC connection, for example in response to or in association with the uplink data provided by the UE 106. Note that, at least in some instances, the UE 106 may choose to transmit data of the class specified in the indication, and/or may send data belonging to another class, if desired.

Note that the techniques for deterministically scheduling RRC connections between a UE 106 and a BS 102 described herein above with respect to FIG. 7 may also be used in parallel with dynamic RRC connection scheduling techniques, if desired. For example, it may still be possible for a UE 106 to dynamically initiate an RRC connection with a BS 102 (e.g., in addition to deterministically scheduling other RRC connections with the BS 102 in advance), such as if the UE 106 generates high priority data that would require immediate transmission in order to meet the delay budget of the data.

Note additionally that while the method of FIG. 7 is described above as being performed between a UE 106 and a BS 102, at least in some instances it may be possible for a MME, SGW, PGW, or other network element to perform some or all of the method elements described as being performed by the BS 102. For example, indications of upcoming data traffic or one or more user devices may be provided to an MME or S/P-GW, which may perform scheduling of upcoming RRC connections, and may then provide indications of such scheduled RRC connections back to the user devices (e.g., by way of a base station). Note that at least in some instances, the establishment of those scheduled RRC connections may still be performed between user devices and their serving base station(s), in such a case.

Figure 8:
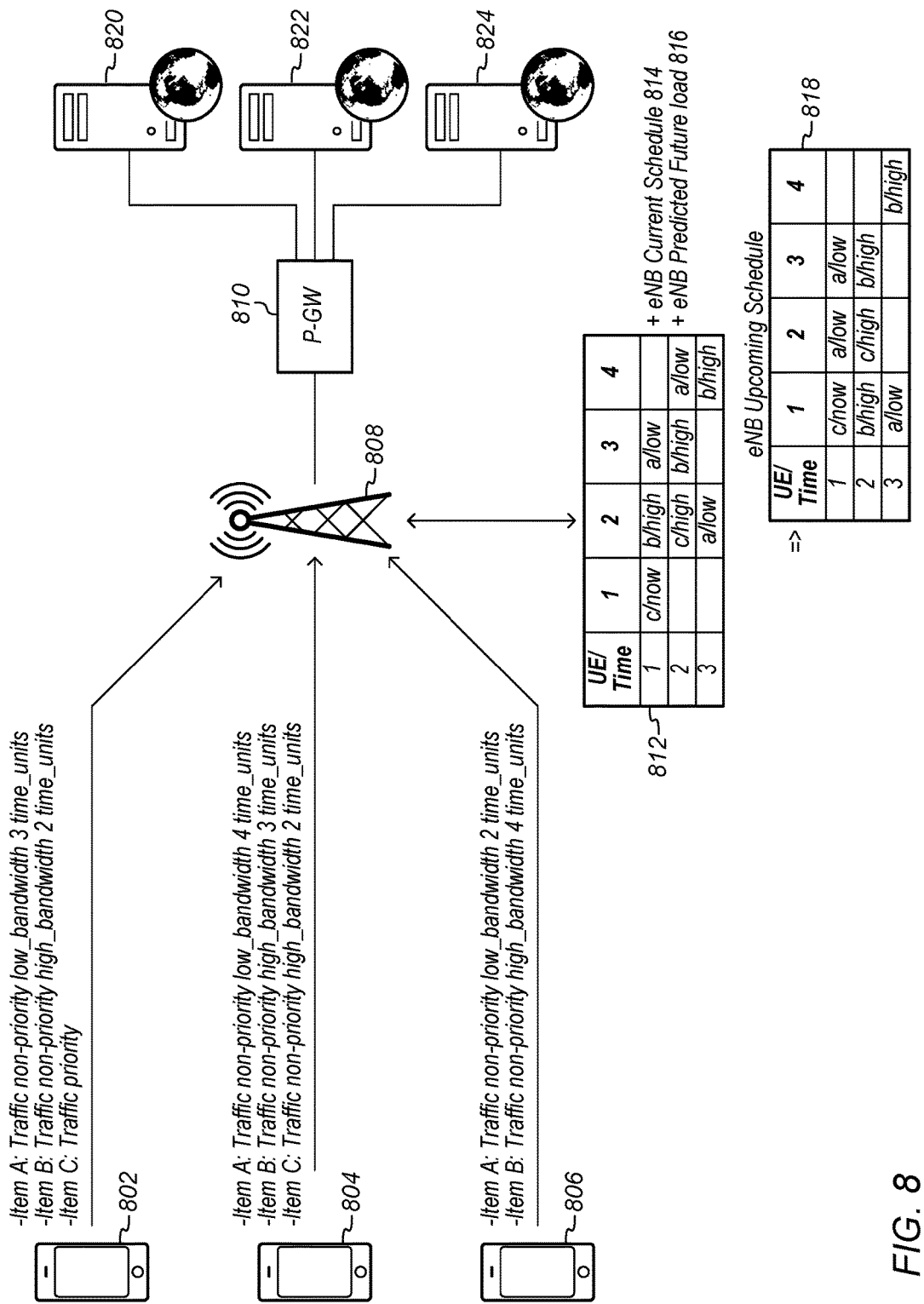
FIG. 8 is an end-to-end (E2E) diagram illustrating aspects of the method of FIG. 7, according to some embodiments.

FIG. 8—Exemplary End-to-End (E2E) Diagram

FIG. 8 and the description provided herein below in conjunction therewith are provided as being illustrative of further considerations and possible implementation details of the method of FIG. 7, and are not intended to be limiting to the disclosure as a whole. Numerous variations and alternatives to the details provided herein below are possible and should be considered within the scope of the disclosure.

In LTE and for cellular communication in general, for at least some background traffic and low priority/non-time critical traffic scenarios where the user has a large delivery time boundary requirements, solutions to reduce battery consumption and limit signaling overhead on the network may be desirable.

On the UE side, solutions to intelligently "bundle" traffic and reduce the overhead of control plane communication may be implemented. However, even with UE centric solutions to bundle data, lack of synchronization with other UEs within the same transmission/reception zones can cause DNS/RRC signaling floods, which can cause severe degradation of performance of the base stations (e.g., eNBs).

As one possibility for addressing such considerations, a framework between UEs and network components to further reduce battery consumption and limit signaling overhead on the network may be used.

As part of such a framework, the UE may analyze and build a user pattern to determine which applications are a priority and which are not for the user. The UE may exchange this information with the network components. The pattern may be exchanged during any of its connected states and the device may be provided with opportunities to modify it (e.g., based on changing application usage needs) with minimal user impact. Capabilities for static information exchanges (e.g., for priority/time critical applications) and for dynamic information exchanges (e.g., depending on the traffic generated by the UE) may be provided.

As one possibility, multiple configuration options for different RRC connections may be exchanged, agreed upon and stored between the UE and the eNB. Then, during actual scheduling and exchange of data, the network may choose one of these stored configurations and inform the UE of the choice.

These configurations may be specific to the type of data transfer being made; the network may decide which is the best configuration for the UE based on the current data pattern. The configurations may include parameters (SR/CSI frequency/periodicity, SPS configuration, etc.) related to data type for which an RRC connection will be used, and/or power settings options such as idle DRX (I-DRX)/connected DRX (C-DRX) configurations, fast dormancy options and RRC inactivity timer options. Options such as priority, expected bandwidth, and expected delay sensitivity may also be exchanged.

In order for this exchange of information to occur, at least one of an RRC message, NAS message, or MAC control element may be used, at least according to some embodiments. The protocol exchange and the classes of configuration(s) may be mutually agreed between the network and the UE. Additionally, the network may be able to understand changing UE radio requirements using information available through UE reporting mechanisms and changing application priorities and traffic types.

The eNB may also make decisions regarding the RRC state of a UE depending on the window (e.g., the amount of time to schedule certain data as agreed with the NW) for application data scheduling (which may, for example, be contrasted with approaches focusing on inter-arrival times). For example, the eNB may decide if the UE needs to stay in RRC connected state with a longer C-DRX cycle with a high value of RRC inactivity timer, or in RRC idle mode with a short RRC inactivity timer. Alternatively or in addition, the eNB may determine values for the C-DRX inactivity timer, and/or may determine C-DRX/I-DRX parameters in such a manner, among various possibilities.

As an example, a UE might provide some or all of the following information to an eNB:

Class A: Traffic non-priority low_bandwidth 3 time_units long_cdrx_cfg_1 long_inactivity_cfg_2 traffic_type_x delay_tolerence_cfg_1

Class B: Traffic non-priority high_bandwidth 2 time_units no_cdrx network_rrc_tear_cfg_4 traffic_type_y delay_tolerence_cfg_2

Class C: Traffic priority short_cdrx_cfg_2 short_inactivity_cfg_1 traffic_type_z delay_tolerance_cfg_3

Such information may indicate that the UE has three different types of expected upcoming data traffic, and may indicate various characteristics/preferences (such as expected bandwidth, length, requested DRX configuration settings, delay tolerance configuration, etc.) with respect to each type. Note that, at least in some instances, it may not be required to explicitly specify the characteristics/preferences, for example if RQoS classes are agreed between the network and UE; in such a case, the UE may inform the network of the RQoS class(es) which it requires, which may implicitly provide additional information regarding the data traffic characteristics and/or requested RRC connection parameters.

Note also that upon generation of traffic by the UE which has not already been indicated (and, for example, which has some priority), it may also be possible for the UE to provide a 'dynamic' or supplemental indication, for example adding a 'Class D'.

FIG. 8 illustrates an end-to-end diagram illustrating a method for scheduling RRC connections in an exemplary LTE scenario, according to some embodiments.

As shown, each of multiple UEs 802, 804, 806 may provide an indication to their serving eNB 808 of their expected upcoming data traffic and its characteristics/classes. The eNB 808 may consider such preliminary information 812, as well as the eNB current schedule 814 and eNB predicted future load 816 (which may be at least partially informed by communication with the P-GW 810, which may provide a link with one or more servers 820, 822, 824 to and from which data communications may be performed), to generate a schedule of upcoming RRC connections 818. Thus, once the time at which a UE has to be scheduled occurs, the eNB 808 can guarantee an RRC connection for the particular UE.

Note that as an alternate possibility, information regarding data traffic type may be provided by UEs to a mobility management entity (MME) and or (S/P)-GW, which may perform RRC connection scheduling for the UEs.

The eNB may also transfer scheduling information back to the UE. For example, the network may inform the UE of a sleep wake-up schedule for the UE and the particular type of traffic that the UE can do at that time, thus guaranteeing a RRC connection. The UE will receive a page, then establish an RRC connection (e.g., according to the specified RRC connection parameters), and get/send the data traffic. This may, at least in some instances, result in the UE obtaining an optimized connection (e.g., in terms of delay and bandwidth).

Note further that, at least in some instances, this may eliminate the need for the UE to send push type of notifications to the server, and may also/alternatively avoid the time related pings which may be a consequence of NAT timer settings on some networks.

As an alternate solution, it may also be possible for the P-GW to gather all the information related to the UE clients, gather the information from the respective end-nodes (e.g., servers) and send it back to the UE as a terminating connection. As one example, such a solution may be useful for VoIP type of clients where there is very little user information exchanged per keep-alive. However, for accounts for which security is particularly important, the UE based mechanism may be preferable, at least in some instances.

Figure 9:
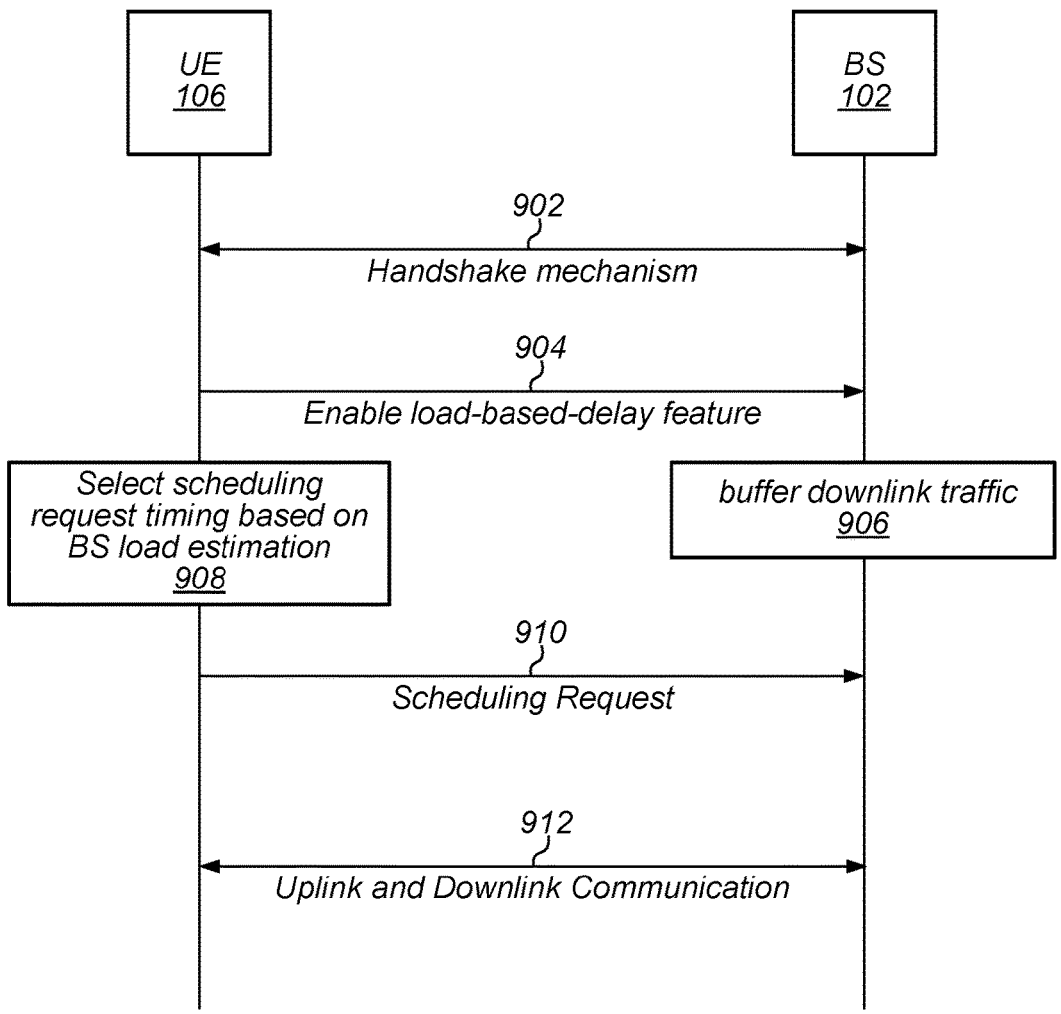
FIG. 9 is a communication flow diagram illustrating an exemplary method for implementing a load-based-delay feature, according to some embodiments.

FIG. 9—Communication Flow Diagram

FIG. 9 is a communication/signal flow diagram illustrating a scheme for a load-based-delay feature between wireless devices and base stations, which may reduce device power consumption, according to some embodiments. The scheme shown in FIG. 9 may be used in conjunction with any of the computer systems or devices shown in the above Figures, among other devices. In various embodiments, some of the elements of the scheme shown may be performed concurrently, in a different order than shown, or may be omitted. Additional elements may also be performed as desired. As shown, the scheme may operate as follows.

In 902, a UE 106 and a BS 102 may exchange information in a handshake mechanism to determine whether or not both entities support a load-based-delay feature. Thus, the handshake mechanism may establish that both the UE 106 and the BS 102 support the load-based-delay feature (i.e., in the case that both do support the feature).

As one possibility, the handshake mechanism may include an exchange of information during radio resource control (RRC) connection establishment. For example, UE support of such a feature may be indicated in a UE capabilities information element (IE), while BS support of such a feature may be indicated in an RRC connection reconfiguration message which may follow the exchange of UE capability information. Other mechanisms are also possible.

In 904, the UE 102 may provide an indication to the BS 106 to enable the load-based-delay feature. As one possibility, the indication may be a power preference indicator (PPI) having a value indicating a preference for a lower power usage configuration (e.g., '1'), which may be provided by the UE as part of a UE Assistance Information IE. As another possibility, the indication may be a MAC control element having a value indicating a request to enable the load-based-delay feature.

The indication may be provided at any of various times, and based on any of various considerations. As one possibility, the indication may be provided at a time at which low downlink and/or uplink activity is detected, and the existing traffic is relatively delay insensitive (e.g., having a delay sensitivity below a delay sensitivity threshold, such that no or minimal adverse effect will be caused by introducing a degree of delay expected to be introduced by the load-based-delay feature). For example, 'background' and/or 'best effort' type traffic may have delay sensitivity characteristics such that the load-based-delay feature may be appropriate, at least in some instances.

Based on enabling the load-based-delay feature, in 906 the BS 102 may begin buffering any downlink traffic intended for the UE 106 until an uplink scheduling request is received by the BS 102 from the UE 106, e.g., in order to align the downlink traffic with uplink traffic from the UE and reduce the UE awake time. Such buffering may also be subject to overall buffer size and fullness at the BS 102, and/or a timer (e.g., in order to avoid excessive delays). For example, in some instances, if buffer fullness above a certain threshold is detected by the BS 102 before an uplink scheduling request is received, the BS 102 may provide a downlink grant and transmit the downlink traffic to the UE 106 even if the load-based-delay feature is enabled. As another example, in some instances, if a data buffering timer expires before an uplink scheduling request is received, the BS 102 may provide a downlink grant and transmit the downlink traffic to the UE 106 even if the load-based-delay feature is enabled.

Additionally, based on enabling the load-based-delay feature, in 908 the UE 106 may select uplink scheduling request timing based at least in part on estimated load of the BS 102. For example, the UE 106 may attempt to select a time at which to transmit an uplink scheduling request when the BS 102 is relatively unloaded. This may help smooth network load and reduce the amount of time for which the UE 106 may remain awake waiting for an uplink grant in response to the scheduling request, which may also reduce power consumption by the UE 106.

Note that the uplink request scheduling timing by the UE 106 may also be subject to buffer fullness threshold and/or data buffering timer constraints, in some instances.

In 910, the UE 106 may provide (transmit) an uplink scheduling request to the BS 102, e.g., according to the selected timing. For example, according to the load-based-delay feature, the UE may buffer uplink application data traffic until one of estimated loading of the BS is below the loading threshold; a buffer fullness threshold is exceeded; or a data buffering timer expires, and provide the uplink scheduling request upon detecting one of those conditions.

In 912, the UE 106 and the BS 102 may perform uplink and downlink communication. The communication may be partially or entirely temporally overlapping. For example, based on the uplink scheduling request, the BS 102 may provide an uplink grant, and may also at or around the same time provide a downlink grant. The UE 106 may then transmit uplink data during the uplink grant, and the BS 102 may transmit downlink data (which may have been buffered, such as described with respect to step 906) during the downlink grant.

Note additionally that at least in some instances, a further mechanism may be used to reduce power consumption in conjunction with the above-described method by delaying scheduling request responses. For example, if desired, it may also be agreed between the UE 106 and the network providing the BS 102 that when a power preference indicator is enabled (or by default as part of the load-based-delay feature, if desired), a 'delayed scheduling request response' feature may also be enabled. In this case, after sending an uplink scheduling request, the UE 106 may enter (return to) a sleep mode as part of its C-DRX cycle until its next scheduled on-duration. The BS 102 may thus wait (at least) until this next scheduled on-duration of the UE 106 to provide an uplink grant in response to the scheduling request. This may reduce power consumption by the UE 106 relative to an implementation in which the UE 106 continuously monitors for a grant upon sending a scheduling request.

Figure 10:
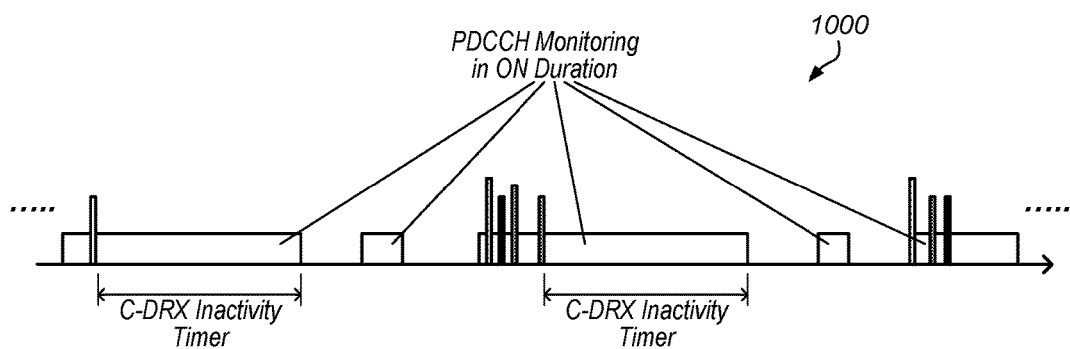
FIGS. 10-11 illustrate exemplary details relating to the method of FIG. 9, according to some embodiments.
Figure 11:
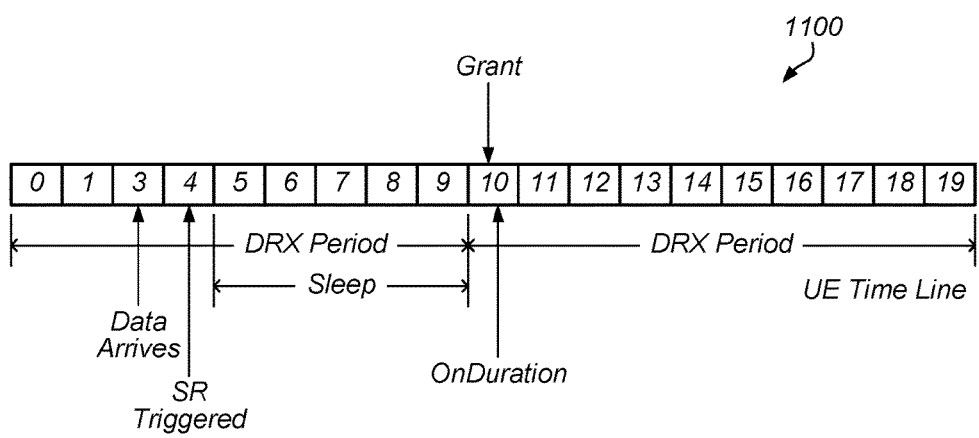

FIGS. 10-11—Exemplary Details Relating to FIG. 9

FIGS. 10-11 and the description provided herein below in conjunction therewith are provided as being illustrative of further considerations and possible implementation details of the method of FIG. 9, and are not intended to be limiting to the disclosure as a whole. Numerous variations and alternatives to the details provided herein below are possible and should be considered within the scope of the disclosure.

In 3GPP Release 11, a Power Preference Indicator is introduced to allow a mobile device to inform the network (NW) of the mobile device's power saving preference. At least according to 3GPP Rel. 11, it is not specified how eNBs are to use this 1-bit information. The UE preference in terms of battery saving may depend on the UE activity (e.g., type(s) of applications that are active), which information may not be available at the eNB. Hence a mechanism to share information between eNBs and UEs and to coordinate operation to enable power saving benefits at UEs may be desirable.

As one possibility a UE might be running one or more Applications that utilize and/or require background traffic, such as email applications. This traffic may be infrequent and/or not time critical (for example, a daemon may be used to detect the background traffic). In case the cell (e.g., eNB in LTE) is loaded, the UE might not get a grant for such traffic in a timely manner. This might prolong the UE awake period, which may in turn impact the battery consumption.

It may be possible for a UE to estimate eNB cell utilization during RRC Connected and Idle mode. The UE could use such information to schedule its background data traffic. For example, the UE may buffer its data until load condition (and channel conditions) improve and/or indicate to the eNB that the downlink transfer can happen at a future time. The UE and the eNB may establish a hand-shake mechanism to ensure compatible behavior in this regard.

For example, in the case a UE is running a non-priority best effort application (e.g., non time critical/background traffic), the UE may ask for a grant only if the load conditions are favorable (e.g., below a certain threshold).

The eNB, based on the hand-shaking mechanism, may know the type of UE traffic. Accordingly, it may also buffer the DL traffic and make sure to align with the UL (uplink) traffic in order to reduce the awake time. For example, the eNB may wait for a scheduling request (SR) from a UE in such a scenario before communicating the DL traffic.

Note that the buffering at the eNB may be enabled/disabled at various times further based on data buffer size and/or fullness. For example, if the number of the bits in all queues is less than a threshold, then the eNB may delay the traffic until load conditions improve and/or to align UL/DL traffic, but may not if the if the number of the bits in all queues is greater than the threshold. Other algorithms for determining when to enable or disable such buffering are also possible. Note also that such buffering may be performed between the NW and the UE only for RRC connected mode, at least in some instances.

The hand-shake mechanism itself may utilize RRC signaling to enable the UE and the eNB to detect that they support such feature. As previously noted, such a mechanism could be agreed upon between the UE and the eNB.

As one possibility, an RRC message that is sent once when the UE establishes an RRC connection to the NW to indicate that it supports the "delay until better load" feature may be used. The UE Capability Information message could be one such RRC message to use to indicate to NW that the UE supports the feature. Such information may be provided in any of various information elements within this message. As an example, a new information element within the UE-EUTRA-Capability container information element may be defined and used to indicate support for the "delay until better load" feature. As a still further example, a new value of an existing parameter in the feature group indicator (FGI) IE may be defined as indicating support for the "delay until better load" feature. Numerous other possibilities may alternatively be used if desired. Additionally, note that the UE can also include, in the modified RRC message, the information about the application traffic.

To complete the handshake mechanism, the network may acknowledge to the UE that it supports the "delay until better load" feature. As one possibility, the network may use a new information element in the RRC Connection Reconfiguration message that follows the exchange of UE capability information. Similarly, however, numerous other possibilities may alternatively be used if desired.

Once the UE is detecting a long period of low activity, with background traffic, the UE may send an indication, such as a reserved MAC control element (e.g., which may be agreed upon with the NW) or a "Power Pref Ind=low Power" indication, to the network requesting that the "delay until better load" feature be enabled. If desired, such an indication may also indicate to the eNB to buffer data for a particular type of application. Subsequently, upon detection of the indication, the eNB may buffer the traffic until reception of an SR from the UE. Note that if desired, the UE may additionally change to an extended DRX cycle in conjunction with sending the indication requesting the load-based-delay feature be enabled. The eNB may buffer the data, e.g., as long as the buffer sizes didn't exceed a predetermined threshold and/or if a timer (e.g., defined at the eNB) expires and the eNB has not received an SR yet (e.g., to avoid excessive buffering delays).

As previously noted, the UE may send the indication requesting enablement of the load-based-delay feature upon detecting a long period of low activity, at least in some instances. On the UL, the UE may know the nature (e.g., time critical or not) of the applications running and may have an estimate of its buffer status. Accordingly, the UE may know when the UE needs to send an SR (e.g., including taking into account the load estimation). In the DL, however, the UE may need to estimate the DL activity. FIG. 10 illustrates aspects of one possible technique for doing so, according to some embodiments.

In particular, a UE may monitor the number of DL assignments received in the physical downlink control channel (PDCCH), and determine a DL activity level based on its observations. For example, if the average number of DL assignments in a number of C-DRX cycles is less than a threshold, 'low DL activity' may be considered to have been observed, while 'high DL activity' may be considered to have been observed if the average number of DL assignments in the number of C-DRX cycles is greater than the threshold. Alternatively, 'low DL activity' may be considered to have been observed if n (threshold) or more out of the N (monitoring window) last PDCCH monitoring TTIs do not include a DL assignment, while 'high DL activity' may be considered to have been observed if less than n out of the N last PDCCH monitoring TTIs do not include a DL assignment. Thus n/N may be an activity ratio.

Thus, considering the illustrated scenario 1000, eight total DL assignments are received in the five C-DRX cycles (for an average number of DL assignments per C-DRX cycle of 1.6) and one or more DL assignments are received in three of the five C-DRX cycles, such that activity ratio is 2/5.

FIG. 11 illustrates an optional mechanism for additional potential power savings, in which eNB SR responses may be strategically delayed when low-power operation is desired. Currently, when a UE sends an SR, UE will break DRX and start monitoring in the DL continuously, at least according to some embodiments. Due to this the UE may be awake for a relatively long time (e.g., depending on the NW load). According to the mechanism illustrated in the exemplary arrangement 1100 illustrated in FIG. 11, however, the UE may instead go to sleep after sending the SR, and the NW may schedule the UE at the next OnDuration(s) according to UE's C-DRX cycle. Note that in some instances, if the UE is in a long DRX cycle before sending the SR, the UE may fall back to a short DRX cycle after sending the SR, e.g., to reduce the introduced SR response delay.

Additionally or alternatively, if desired, in case the SR opportunity aligns with the ON duration, if the UE does not receive an uplink grant after sending the SR before the following SR opportunity, and the following SR opportunity falls during the Off period, the UE may elect to not resend the SR during the SR opportunity falling during the Off period, but may instead elect to wait for the next ON duration to resend the SR.

FIGS. 12-16—AP/BB Synchronization and Additional UE Power Consumption Reduction Mechanisms FIGS. 12-16 and the following supplementary description are provided as being illustrative of further considerations and possible implementation details, and are not intended to be limiting to the disclosure as a whole. Numerous variations and alternatives to the details provided herein below are possible and should be considered within the scope of the disclosure.

In a communication network such as LTE, there may be at least two radio interface entities, NW and UE. Furthermore, in a UE there may generally be at least two entities, the application processor (AP) and baseband processor (BB).

At least in some current implementations, there may be no synchronization between a NW and a UE to determine the instances of data availability such that the NW is able to schedule opportunistically and/or for the UE to wake and listen opportunistically. Due to this lack of synchronization, UEs may generally be expected to wake up at every DRX cycle and stay on for the 'onDuration' time.

Furthermore, between the AP and BB entities in a UE there may be little synchronization regarding when to transmit (Tx) and receive (Rx) data and when to wake up. Due to this lack of such synchronization, the AP may wake up the BB to send data when there is no transmit opportunity, or when obtaining transmit opportunity is costly (e.g., in terms of power and resources). Additionally, the AP may wake up based on application specific timers and try to send/receive data, in a manner that is not synchronized to the BB and NW timings.

Accordingly, certain features for synchronizing all the entities in a communication network (e.g., NW, BB, and AP) for effective power savings are described herein.

When connected mode DRX is used, the communication between the NW and UE may be synchronized in the DL direction, as the NW may send only during the 'OnDuration', which repeats every DRX cycle. In the UL direction a UE may be able to initiate data transmission to the NW at any time using an SR or a RACH (e.g., depending on the criterion to initiate).

Whenever possible, it may be advantageous for the communication between the UE and NW to be synchronized to the configured DRX. Such synchronization may include the AP waking up and sending data to BB in a manner that maps to the BB wakeup times and/or transmit/receive opportunities. Such synchronization may also include the AP providing timing information to the BB based on the applications currently running on the AP. In particular, indicating timing of the next expected data (potentially including either or both of an amount of time until uplink application data or downlink application data is next expected by the AP, among various possible ways of defining the next expected data) may allow the BB to sleep for a longer time period (e.g., skipping one or more DRX cycles or extending a DRX cycle).

Figure 12:
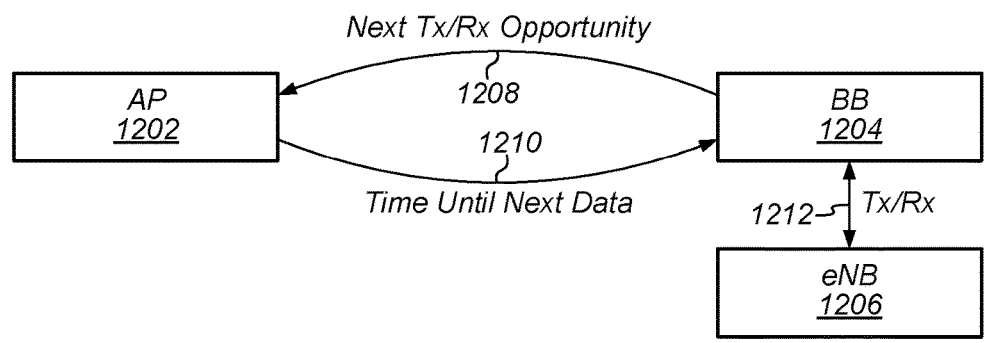
FIGS. 12-16 illustrate exemplary aspects of AP/BB synchronization and additional UE power consumption reduction mechanisms, according to some embodiments.
Figure 13:
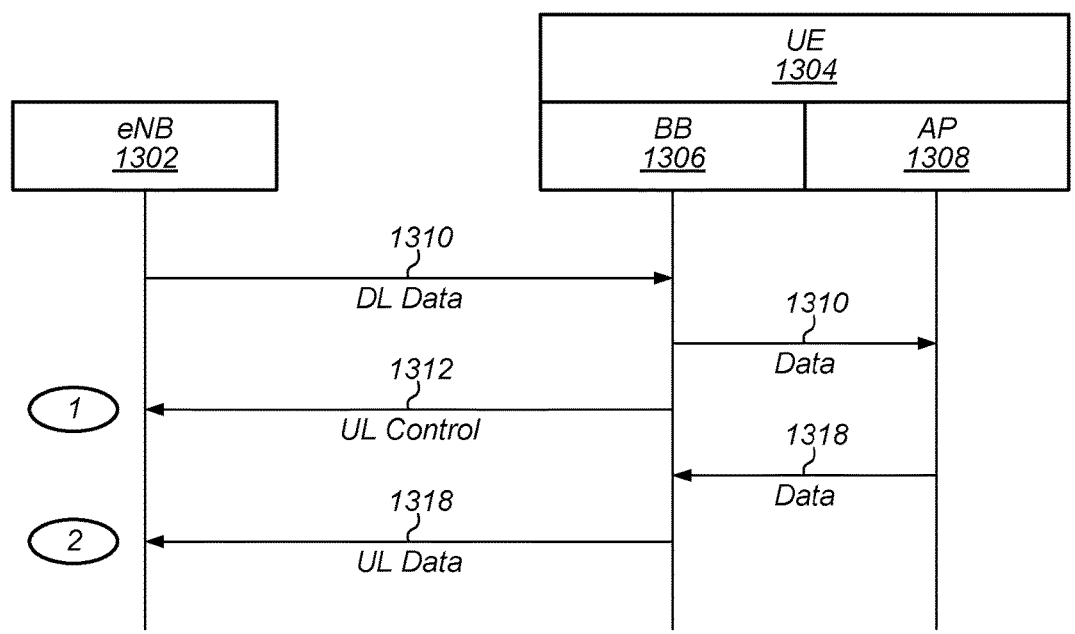
Figure 14:
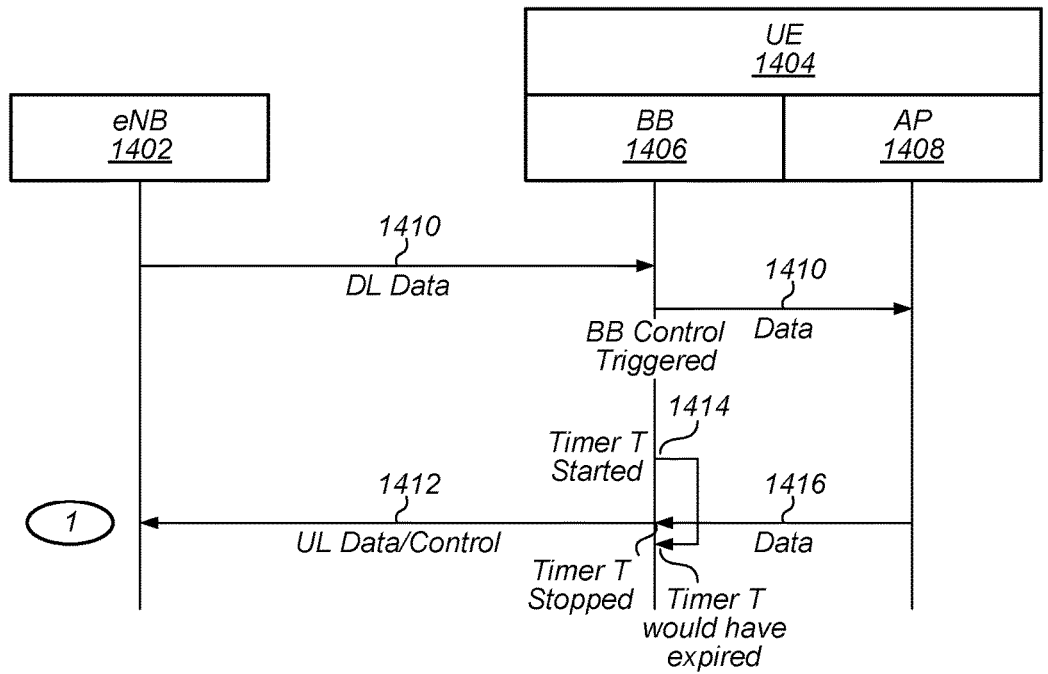
Figure 15:
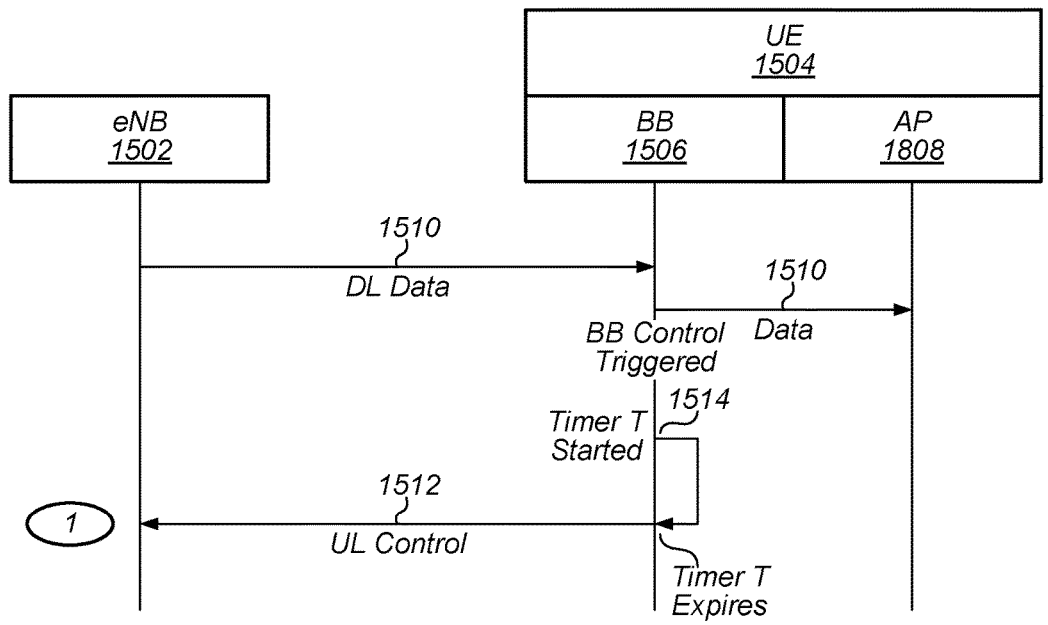

Hence, the BB and the AP may exchange timing information with each other to provide this synchronization. In particular, and as illustrated in FIG. 12, the BB 1204 may communicate the next available BB wake up and/or transmit/receive opportunity time 1208 to the AP 1202, and/or the AP 1202 may communicate the time until the next expected data 1210 to the BB 1204.

The BB 1204 may derive the next available wake up time based on the last data transmit/receive time and the next wake up, and/or transmit/receive opportunity time, e.g., based on NW configuration and scheduling. In connected mode this may be based on the connected DRX configuration, SRS periodicity, RACH opportunities, etc. In idle mode this may be based on the Idle DRX configuration and scheduling.

The AP 1202 may derive the time until the next expected data based on the buffers being accumulated in the AP 1202, as one possibility; for example, when running a streaming video application, there can be multiple DRX cycles where there will not be any data activity, e.g., if sufficient playback information is already buffered at the AP 1202. Alternatively or in addition, AP 1202 may derive the time until the next expected data based on the heartbeat of the application(s), which can be below the connection release timer.

When the AP 1202 communicates the next expected data, the BB 1204 may wake up according to the timing given by the AP 1202 (and matching to the UE's DRX configuration). Note that this may result in the BB 1204 skipping some DRX cycles (or extending the DRX cycle).

When (the BB 1204 of) the UE wants to extend the DRX cycle, the UE may communicate (e.g., to an eNB 1206 of the NW) the DRX cycle extension as a multiple of the current configured DRX configuration and a duration in which UE does not expect much data activity. The DRX cycle of the UE may accordingly be extended for the specified duration.

If instead the BB 1204 skips some DRX cycles (does not wake up during the OnDuration of those DRX cycles), and if the NW sends any data in the 'OnDuration' corresponding to those DRX cycles, the UE will miss that data. In order to avoid data loss when the BB 1204 skips a DRX cycle, the NW may need to retransmit the data in the subsequent DRX cycle 'OnDuration'. Since it may be possible for the BB 1204 to skip multiple DRX cycles, it may be desirable to set a maximum limit on the number of DRX cycles that can be skipped by the BB 1204, e.g., in order to limit the number of times NW needs to retransmit the same data. If the number of DRX cycles which could be skipped (e.g., based on the amount of time until the next expected data) is greater than this maximum limit, the BB 1204 may wakeup and listen in the next 'onDuration' after the maximum limit of skipped DRX cycles is reached. This concept may be similar to Idle mode paging, in which the NW may not give up if UE does not respond after the first page, but may instead try multiple times to page a UE before giving up.

Thus, said another way, the BB 1204 may skip some of the C-DRX cycle OnDurations, with a possible limit on the number of C-DRX cycle OnDurations to be skipped. Additionally, if desired, the BB 1204 may communicate to the AP 1202 (for synchronization) that it is skipping some (e.g., specific number of) DRX wakeups. This may make the average DRX cycle length effectively larger than the actual DRX configuration and may lead to greater power gains. At least in some instances, the potential performance issues which might be caused by the BB 1204 skipping the DRX cycles may be compensated for by NW retransmissions.

As a still further possibility, a UE may send an indication to the network of a duration of the number of DRX cycles to skip. As yet another possibility, the UE may send an indication to start and stop this process. This indication can be done using either a MAC Control Element (CE) or a RRC message, among various possibilities.

Quick Transition to Long DRX:

According the current art, at least in some instances while a UE is in a DRX long or short cycle and when a data exchange occurs, the UE may continue to operate in the DRX short cycle before transitioning to a DRX long cycle for a stipulated amount of time according to a short cycle timer (e.g., the parameter 'drxShortCycleTimer'). When the PPI is set as 'lowPowerConsumption' and sent to NW (e.g., indicating that the UE prefers a low power configuration), in the current art a UE may still follow the short DRX for the stipulated number of subsequent DRX cycles before changing to the long DRX cycles.

As a possible modification, upon a UE providing an indication to the network (e.g., by way of a base station), for example by setting the PPI bit as 'lowPowerConsumption', the UE may be able to transition to a longer DRX cycle immediately (e.g., before expiration of the DRX short cycle timer), thus reducing the UE's power consumption. In other words, the UE may enter a DRX long cycle immediately following an instance of sending an indication such as a MAC control element requesting a transition from a DRX short cycle to a DRX long cycle or a PPI indication as 'lowPowerConsumption' to the NW, at least in some embodiments.

Default/Pre-Configured Configuration:

At least in some instances when a UE toggles between PPI ON/OFF (e.g., where PPI ON is taken to mean "lowPowerConsumption" and PPI OFF is taken to mean "normal" configuration), the NW needs to send explicit messages to change the configuration. This may lead to a large amount of signaling in the case of frequent PPI ON/OFF from many UEs.

In order to reduce the signaling burden, it may be possible for the NW to provide a default or pre-configuration for power-optimized configuration. In this case, the default configuration may be implicitly assumed to be in place upon sending a request for a low-power configuration (e.g., sending a MAC control element or toggling of PPI ON) by a UE if no configuration response is provided by the NW. Thus, in such a scenario, a UE may be able to perform cellular communication with a cellular network according to the established default low-power configuration based on providing a low-power indicator to the cellular network. Note that it may be preferable for such a feature to be configured only when the indicator (e.g., MAC control element or PPI) is sent to NW reliably, e.g., in order to avoid confusion between the NW and the UE. This feature may help avoid frequent configuration from NW when UE keeps toggling between power configurations. Note that it may still be possible for non-default/custom configurations to be provided by the NW in response to a low-power indication in such a scenario if desired.

Consecutive Power Optimal Configuration Indication:

At least in some instances a UE may not be permitted to send more than one PPI indication with the same preference consecutively. There maybe certain disadvantages to a UE being unable to send the same PPI indication multiple times consecutively. As one possible disadvantage, a UE may not be able to choose the optimal power configuration in an incremental (e.g., step by step) manner. For example, if there is more than one configuration which can give incremental power performance, UE may not be able to make use of that, and may instead only have one opportunity to indicate an optimal configuration. As another disadvantage, after a UE sends a PPI ON indication, if at a later point in time if the NW moves the UE to a 'normal' configuration (e.g., based on data, etc.), UE may not be able to send the PPI as ON again and move to power optimal configuration based on the latest configuration, e.g., since the current specification documents may specify that the PPI indication may only be different from the last indicated one.

However, it may be possible (e.g., in a proprietary implementation or according to a specification change) for a UE to send the PPI indication with the same preference/value more than once consecutively. This may indicate an incremental change in the power configuration settings, and/or may indicate a preference for a low power configuration corresponding to a different type of communication scenario.

Early DRX Entry

While many applications' characterization may reveal that a higher inactivity timer gives good performance, there may also be occasions on which a UE does not have traffic while the inactivity timer is still running. In such cases, if the UE can enter DRX early, the UE may experience better power performance, at least in some instances.

To do this, a UE might communicate on the UL (uplink) an indication or request to enter into DRX mode 'early' (i.e., before expiration of the inactivity timer). Currently it may be the case that only the NW can ask the UE to enter DRX (e.g., by MAC DRX command) and the UE may not have a facility to communicate its willingness to enter DRX mode early.

Figure 16:
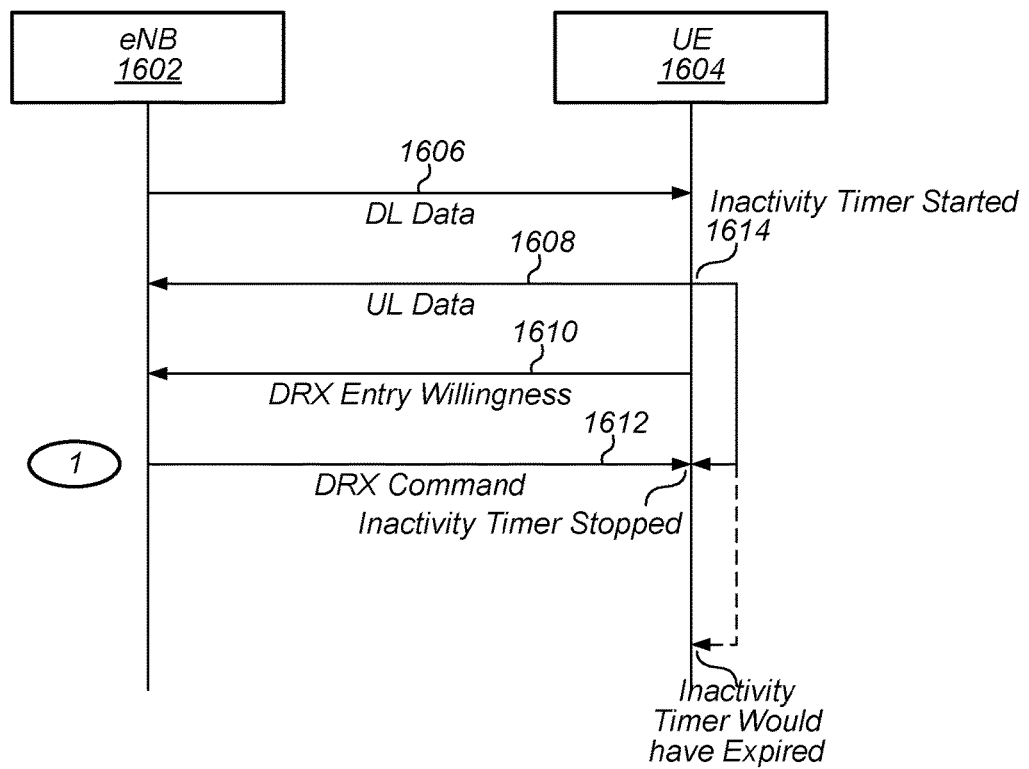

It may be possible, however, to define a command or indication for requesting early DRX entry which a UE may communicate to the NW. FIG. 16 illustrates the use of such a command. In such a case, a UE 1604 may communicate downlink data 1606 and/or uplink data 1608 with the NW (e.g., via eNB 1602). After such data communication, in 1614 an inactivity timer may be initiated. Upon determining it is willing to enter DRX early (which may be based on information from the AP and/or based on any of a variety of other reasons), the UE 1604 may communicate an indication 1610 to the NW (e.g., via eNB 1602) of the UE 1604's willingness to enter DRX mode before the inactivity timer expires. Upon receiving this indication 1610, the NW may send a DRX command 1612 to the UE, or if desired the UE may implicitly move to DRX mode on the expectation that the NW will receive this indication. This indication can be sent by the UE to NW in either a MAC control element or an RRC message, though it may be preferable in some instances to use a MAC control element, since the existing DRX command by which the NW can ask UE to enter DRX is a MAC CE. Thus, the UE 1604 may stop the inactivity timer and enter DRX prior to the time when the inactivity timer would have expired.

Application Aware UE Configuration:

Traffic pattern varies from application to application, and due to vast variety of the applications, a single configuration or a few configurations may not suit and all the applications and all the UEs. Below is a list of options that can provide benefits, e.g., for better power performance, at least according to some embodiments.

At least in some instances the NW may provide a configuration to a UE and the UE may follow the provided configuration. But it may be advantageous if the NW shares a set of possible configurations with the UE, the UE selects one of them (e.g., based on the traffic at the UE), and the UE communicates the selection to the NW.

Thus, according to some embodiments, the NW may share a set of possible configurations with a UE, each configuration of which may include any or all of DRX settings, PUCCH, SRS, SR, RRC inactivity timer, etc. The UE, based on the current traffic/application at the UE (e.g., as indicated from the AP of the UE to the BB of the UE), may choose a configuration among those shared, and communicate it to the NW. The UE and the NW may subsequently follow the chosen configuration.

Additionally, or alternatively, the NW may share a further set of possible configurations (or include further parameters in the set of configurations), which may include but are not limited to DRX and/or RRC inactive timers, OnDuration, short DRX cycle timer, etc. Similarly, the UE may choose one (or more, if multiple types of configuration groups are shared) of them based on the traffic and/or application at the UE.

Note that certain applications may be more sensitive to inactivity timers such as the DRX inactivity timer and the RRC inactivity timer. Thus, a UE may be able to customize the inactivity timers based on the application running and communicate these customized options to the NW. Optionally, a UE may also customize the OnDuration based on the application/traffic that is running, if desired.

As a further possibility, a UE may select the parameters or configuration settings itself and communicate its selections (e.g., again based at least in part on traffic and/or application at the UE) to the NW.

As a further feature, it may be possible for a UE to communicate the application info/type(s) and/or the class of data traffic currently active on the UE to the NW, and for the NW to configure the UE's network configuration parameters in a manner specific to or at least partially based upon the application(s) and/or the requested class.

As a yet further feature, PPI indications may be provided/configured on a per bearer and/or Application and/or QCI class and/or class of data traffic for the configured bearers of a given UE.

Adapting DRX Cycles Based on Application Data Traffic

Currently, some applications, such as VoIP, are treated in the same way as any other data connections over cellular. However, just like VoLTE, VoIP applications also transmit/receive (Tx/Rx) small data periodically. VoLTE connections generally have an advantage over these VoIP applications (or other applications having similar data traffic patterns) as the network provides QoS for VoLTE. Although some of these advantages, such as QoS, may not be able to be provided to such applications, application aware communications or negotiations, such as those described above, may provide power benefits of VoLTE by modifying the DRX cycles (e.g., CDRX configuration settings).

In some cases, the default network configuration is 320 ms/200 ms (DRX cycle length/inactivity timer); however, this configuration may be suboptimal for applications like VoIP. For example, better configurations may include 320/10, 160/10, 80/10, 64/10 based on the packet periodicity. By switching from 320/200 to 320/10 better results may be achieved. For example, with the unmodified configuration, CDRX on time as a percentage ranged between 87% and 89% and CDRX off time correspondingly ranged between 11% and 13%. With the modified configuration, CDRX on time was reduced to between 45% and 56% with a corresponding CDRX off time of 44% to 55%, thus resulting in a 30% increase in CDRX OFF time with the modified configuration. Such an increase in CDRX off time may provide overall battery savings during VoIP calls, which may extend to other applications.

In general, different applications (e.g., different VoIP applications) may have different data patterns and periodicities. However, there may not be so many DRX configurations available that match these patterns.

Accordingly, a DRX configuration may be selected that does not match the data pattern/periodicity. For uplink data, this may not be a problem as uplink data may be transmitted using an SR occasion; however for downlink data, data may only be received during CDRX on duration or during DRX inactive time, absent some other solution.

Accordingly, in one embodiment, to solve this, if a DRX configuration exactly matching the VOIP app data pattern is not available, an SR opportunity may be used as a trigger for the downlink data from the network when there is no uplink data and DRX period is not multiple of VoIP data periodicity. Additionally, an SR opportunity may also be chosen such that it overlaps with the on duration so as to reduce the affected CDRX ON time.

Thus, e.g., the application processor or the executing application may provide an indication to the baseband on VoIP call start and end along with the type of active application. As a result, the baseband may modify the DRX configuration that is most suitable to the application while the VoIP call is active. As noted above, if there is no exact match for the VOIP app data pattern, baseband may modify the data traffic using SR opportunities.

Figure 17:
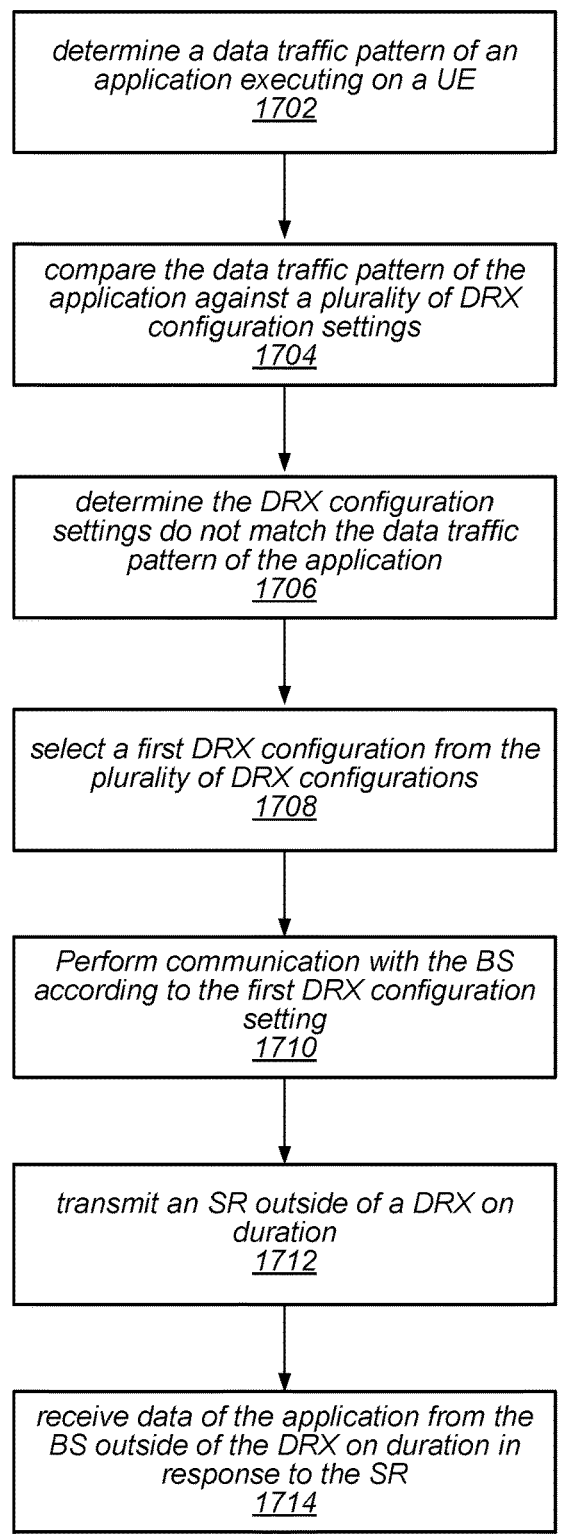
FIG. 17 is a flow chart diagram illustrating an exemplary method for transmitting scheduling requests during DRX, according to some embodiments.
Figure 18:
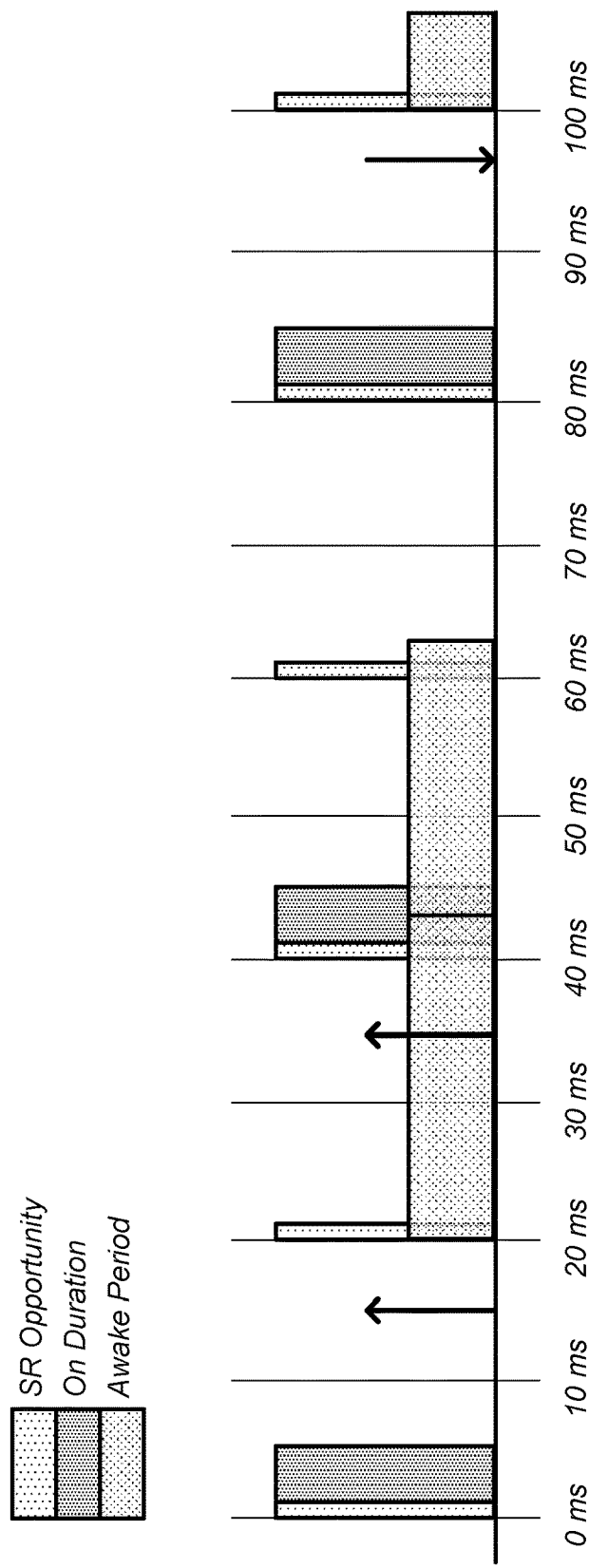
FIG. 18 is a timing diagram illustrating one specific example of transmitting scheduling requests during DRX.

FIGS. 17 and 18

FIG. 17 is a flow diagram illustrating an exemplary method for transmitting scheduling requests during DRX cycles, according to some embodiments. The method shown in FIG. 17 may be used in conjunction with any of the computer systems or devices shown in the above Figures, among other devices. For example, the described method of FIG. 17 may apply to cell phones or any other type of UE, including wearable devices, such as smart watches. Additionally, the method shown in FIG. 17 may be combined with other methods and embodiments described herein. In various embodiments, some of the elements of the method shown may be performed concurrently, in a different order than shown, or may be omitted. Additional elements may also be performed as desired. As shown, the method may operate as follows.

In 1702, a UE may determine a data traffic pattern of an application executing on the UE. For example, the UE may be aware of traffic patterns for classes or types of applications of the UE or even traffic patterns for individual applications. In general, each application may fall into different traffic pattern categories. For example, some applications may be considered "background" applications that transmit or receive data in a sporadic or unpredictable manner. This traffic may sometimes be considered low priority as the particular timing of when the data is transmitted or received may not affect user experience. Such applications may include email applications, social media applications, etc. Other applications may be "foreground" applications, e.g., where the user is actively viewing or interacting with the applications. In some cases, these applications may still have unpredictable or irregular data traffic flows. For example, a web browser may download data for short periods (e.g., in response to the user requesting content) followed by relatively long periods of inactivity whose length may not be predictable (e.g., while the user reads or otherwise reviews the downloaded content). Generally, some applications may have predictable or well-understood data traffic flows. For example, a voice over IP (VoIP) or streaming applications may have a well-defined data traffic pattern, e.g., where application data is transmitted or received at regular intervals or periods, e.g., having a period length of 60 ms. Similarly, gaming applications may also have predictable patterns, e.g., where live updates of the gaming environment are received at regular intervals. Thus, in some embodiments, applications may be categorized according to the type of application (e.g., foreground, background, streaming, etc.) and/or according to the data traffic patterns associated therewith (e.g., predictable/unpredictable, periodic, etc.).

Accordingly, the UE may be able to identify whether the application(s) executing on the UE have predictable data traffic patterns or not and may also be configured to determine the expected data traffic pattern for individual or sets of applications executing on the UE. In some embodiments, this information may be obtained based on stored information on the UE, e.g., for classes of applications (e.g., VoIP applications, streaming applications, gaming applications, etc.) and/or for individual applications. Alternatively, or additionally, the individual application may provide an indication of the data traffic pattern, which may be based on the generic use of the individual application or may be indicated in a more dynamic fashion, based on the current or expected use of the application by the user (e.g., based on input provided by the user within the application). In a further embodiment, the UE may be configured to analyze data traffic of individual applications to determine a data traffic pattern, e.g., which may then be stored for later use. This analysis may occur within a single execution of the application or over multiple executions of the application, as desired.

Determining the data traffic pattern of an application may involve determining whether the data traffic of the application is periodic. For example, for applications having a periodic data traffic pattern, this determination may include determining a period length of the data traffic pattern. As noted above, VoIP applications may have a predictable, periodic pattern of transmitting every n milliseconds (e.g., every 60 ms, among other possibilities). Note that a data traffic pattern that is periodic may include subperiods that are not necessarily uniform in time themselves, but that a particular pattern may repeat each period. In some embodiments, determining the data traffic pattern may include determining an amount or length of time of data transmitted or received each period.

Upon determining the data traffic pattern of an application, in 1704, the UE may compare the data traffic pattern of the application against a plurality of discontinuous reception (DRX) (e.g., connected mode discontinuous reception (CDRX)) configuration settings (or sets of parameters), e.g., which are associated with a base station (BS) in communication with the UE. For example, each of the DRX configurations may specify at least a DRX cycle length, which may specify the length of an entire DRX cycle, including the on duration and off duration. Additionally, the DRX configurations may specify an inactivity timer, which may specify the length of time the UE may stay awake after receiving and/or transmitting data and which may reset each time new data is transmitted and/or received. Other DRX configuration parameters are also envisioned, such as an on duration timer or length, a hybrid automatic repeat request (HARD) timer or length, a retransmission timer or length, a short cycle timer or length, a cycle start offset, etc.

These DRX configuration settings may be ones that are predefined by the BS and/or the network operator of the BS. For example, each BS or network operator may have a set of available DRX configuration settings for selection in order to optimize power savings and/or performance for different applications. For example, these DRX settings may specify sets of DRX cycle lengths and inactivity timers, among others. As some non-limiting examples, the DRX configuration settings may have a default DRX configuration setting for data applications having a cycle length of 320 ms and an inactivity timer of 200 ms (or 320/200 in shorthand). Other possible configurations may include 320/10, 160/10, 80/10, 64/10, among others.

In one embodiment, the comparison of the data traffic pattern against the DRX configuration may include comparing the time length of each period (or "period length") of the data traffic of the application against the DRX cycle length of the respective DRX configuration. For example, a good match between an application traffic pattern and a DRX configuration setting may involve the period time length and the DRX cycle length having the same (or substantially similar, such as within 5% or 10% of each other) values. Additionally, or alternatively, comparing the data traffic pattern of the application against the DRX configuration may involve determining if the inactivity timer is appropriate for the data traffic pattern. For example, a long inactivity timer may not be appropriate for a data traffic pattern involving short, predictable transmissions, e.g., such as for VoIP applications. Contrarily, a short inactivity timer may not be appropriate for a data traffic pattern with less predictable traffic patterns that may involve data transmissions that occur with gaps longer than the inactivity timer. In some embodiments, comparison of the data traffic pattern against the DRX configuration may involve comparing the length or period of the expected data transmissions to the on duration length, or the combination of the on duration length and the inactivity timer.

After comparing the data traffic pattern of the application to each of at least a subset (e.g., all) of the available DRX configuration settings, in 1706, the UE may determine that the DRX configuration setting(s) do not match the data traffic pattern of the application. For example, the UE may determine that none of the DRX cycle lengths match the period length of the data traffic pattern. Alternatively or additionally, the UE may determine that none of the DRX inactivity timers are a good match for the data traffic pattern of the application. Similarly, the UE may determine that none of the DRX on durations (e.g., in combination with the DRX inactivity timers) match the expected period length of the data transmission and/or data reception. For example, the UE may execute a VoIP application that has a 60 ms period length (or interval length), but the closest DRX configuration may have a DRX cycle length of 80 ms. Depending on the sensitivity of the application, even a DRX cycle length of 64 ms may not be close enough to provide adequate performance (e.g., voice quality) to be considered a match.

In the event that none of the available DRX configurations appropriately match the data traffic pattern of the application, in 1708, the UE may select a first DRX configuration from the plurality of DRX configurations. For example, the UE may select a first set of DRX parameters of the plurality of DRX parameters based on the data traffic pattern of the application or applications executing on the UE. In making this selection, the UE may consider factors such as the length of the DRX cycle in comparison to a period length of data traffic of an application executing on the wireless device.

In one embodiment, the UE may select the closest DRX settings according to a variety of criteria. For example, for applications having periodic, but short, traffic transmissions/receptions, a short inactivity timer may be important. Accordingly, the selection may initially filter out DRX configurations whose inactivity timer does not align well with the identified traffic pattern. Correspondingly, the UE may then select from this subset based on the DRX cycle length. For example, the UE may select a DRX cycle length that is closest in length to the period length of the data traffic pattern. Alternatively, rather than selecting the DRX cycle that is closest in length, the UE may select based on a multiple of the period length of the data traffic pattern, e.g., selecting DRX cycle lengths that are n*period length. Following the example above, where the period length is 60 ms, when following the closest DRX cycle length selection process, the UE may choose the DRX configuration having a 64 ms cycle length; however, when following the multiple of DRX cycle length selection process, the UE might instead select a DRX configuration having a 120 ms cycle length. Note that while the above description applies a two-step process starting with the inactivity timer, that process could be reversed, or the DRX configuration could be selected based only on one of these DRX parameters, among other possibilities.

In 1710, the UE may perform communication with the BS according to the first DRX configuration settings. This communication may include uplink and/or downlink data transmission for the application. In particular, the UE may generally awake at each DRX on duration, perform communication, and following inactivity for the length of the inactivity timer, go back to sleep until the next DRX on duration, according to the first DRX configuration setting.

However, as noted above, the first DRX configuration setting did not match the data traffic pattern of the application. Accordingly, in 1712, the UE may be configured to adapt or otherwise augment the communications according to the first DRX configuration setting by transmitting a scheduling request (SR) outside of the DRX on duration, based on the data traffic pattern of the application. In particular, transmitting the SR may be performed based on the DRX configuration settings not matching the data traffic pattern of the application, e.g., in order to correct for this mismatch. For example, where the UE is aware that data should be transmitted by the UE or received from the network (e.g., from another UE or device in communication with the UE via the application), but there is no on duration at the time of that expected transmission/reception, the UE may be configured to transmit an SR to allow the UE to transmit data to the BS or in order to cause the BS to transmit the expected data to the UE. For example, the UE may transmit the SR, receive an uplink grant, and then transmit its data to the BS according to the uplink grant. Alternatively, or additionally, by transmitting the SR to the BS, the BS may now be aware that the UE is awake and may correspondingly transmit any buffered data (e.g., data of the first application and/or other data) to the UE (e.g., in addition to the uplink grant). Thus, in response to transmitting the SR, in 1714, the UE may be able to transmit data and/or receive data of the application outside of a DRX on duration. Following this procedure, the UE may transmit a plurality of SRs outside of DRX on durations in a similar manner, as needed.

As one specific example, a timing diagram is illustrated in FIG. 18. In particular as shown in FIG. 18, an exemplary 40 ms DRX cycle is illustrated. In this example, a DRX on duration may occur every 40 ms. In the example shown, each on duration lasts approximately 5 ms. Every 20 ms, an SR opportunity occurs. Thus, there is an SR opportunity at approximately the midpoint of each DRX cycle, in this example. At approximately 15 ms on the exemplary diagram, the application, according to the data traffic pattern that the UE has determined, provides uplink data for transmission to the BS by the UE. This uplink data is indicated by an upward pointing arrow on the diagram. In response to this uplink data, the UE transmits an SR during the next SR opportunity at approximately 20 ms. Accordingly, within, e.g., 5-12 ms of transmitting the SR, the UE may receive an uplink grant from the BS and transmit the data. The UE may then stay awake according to the inactivity timer of the DRX configuration in effect. In this instance, the UE's awake period extends into the next on duration at approximately 42 ms, as indicated by the shaded "Awake Period" of FIG. 18.

At approximately time 35 ms, the application, according to the data traffic pattern that the UE has determined, provides second uplink data for transmission to the BS by the UE. In some embodiments, this uplink transmission may be performed promptly (e.g., within 5 ms) as the UE is still "awake" following the previous transmission. Alternatively, or additionally, the UE may simply wait until the next on duration to perform the transmission of the second uplink data. Following the on duration, and based on the transmission of the second uplink data, the UE may be awake until approximately 63 ms, e.g., based on the inactivity timer in effect. For example, the inactivity timer may be 10 ms, so data transmission may end by approximately 53 ms in the illustrated example. Upon expiration of the timer, the UE (e.g., the baseband of the UE) may enter a low power mode or sleep mode until the next on duration at 80 ms. During this period, the UE may wake up for the on duration period and then go back to sleep, as no data was available for transmission or reception.

At approximately time 97 ms on the exemplary diagram, the application, according to the data traffic pattern that the UE has determined, anticipates downlink data (indicated by a downward pointing arrow) for transmission from the BS to the UE. In particular, because the UE is aware of the traffic pattern of the application, it knows that downlink data should be available for reception at that time. Accordingly, during the SR opportunity at time 100 ms, the UE transmits an SR. In response, based on the UE transmitting the SR (e.g., which indicates to the BS that the UE is not asleep), the BS may transmit an uplink grant and may also transmit the anticipated downlink data to the UE. This activity initiates the inactivity timer and another awake period, beginning at 100 ms.

Note that any or all of the above-described features and embodiments may be modified, deleted, or used individually or in combination, as desired. For example, rather than basing the DRX selection and SR transmissions based on the data traffic pattern of a single application, the method may be expanded to cover multiple applications. In particular, an overall data traffic pattern could be determined for a set of applications executing on the UE and the selection and modification of the DRX configuration settings may be performed based on that overall data traffic pattern.

In some embodiments, the UE may be configured to select a second set (or subsequent sets) of DRX parameters following the transmission of one or more SRs. As another possibility, the UE may also be configured to reset a DRX cycle, e.g., using the SR or another method, as the periodicity of the application data traffic and the DRX cycle length deviate (e.g., as they become out of phase).

In some embodiments, a network or BS may allow the UE to propose a new DRX configuration, e.g., outside of the set of predefined DRX configurations offered by the BS or network, and the UE may determine a set of DRX parameters that match the determined data traffic pattern. The UE may then provide an indication of those parameters to the BS, which may then be implemented. In such an embodiment, SRs may not be necessary, although they could be used in a dynamic fashion, as necessary.

Similarly, when the data traffic pattern may involve both periodic as well as unpredictable intermittent traffic, it may be possible to select a DRX configuration that matches the portion of data that is periodic and/or predictable and then use the SRs for the remaining traffic that is not aligned with DRX on durations.

Note that the various features described in the present disclosure may be implemented individually or in any combination, as desired.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for a user equipment (UE) device communicating during discontinuous reception (DRX), comprising:
by the UE:
determining a data traffic pattern of an application executing on the UE;
comparing the data traffic pattern of the application against a plurality of DRX configuration settings, wherein the plurality of DRX configuration settings are associated with a base station (BS) in communication with the UE;
determining that the plurality of DRX configuration settings do not match the data traffic pattern;
selecting a first DRX configuration setting of the plurality of DRX configuration settings based on the data traffic pattern;
performing communication with the BS according to the first DRX configuration settings;
transmitting a scheduling request (SR) outside of a DRX on duration according to the data traffic pattern, wherein said transmitting the SR is based on the DRX configuration settings not matching the data traffic pattern; and
in response to transmitting the SR, receiving downlink data of the application from the B S outside of the DRX on duration.

2. The method of claim 1, further comprising:
transmitting a plurality of additional SRs outside of DRX on durations according to the data traffic pattern of the application, wherein said transmitting the plurality of additional SRs is based on the DRX configuration settings not matching the data traffic pattern of the application.

3. The method of claim 1, further comprising:
receiving an uplink grant from the BS in response to transmitting the SR; and
transmitting uplink data of the application to the BS according to the uplink grant.

4. The method of claim 1,
wherein said determining the data traffic pattern of the application executing on the UE comprises determining a period length of data transmission and/or data reception; and
wherein said comparing the data traffic pattern against a plurality of DRX configuration settings comprises comparing the period length of the data transmission and/or data reception of the application with a DRX cycle length of each of the plurality of DRX configuration settings.

5. The method of claim 1, wherein selecting the first DRX configuration is based on a DRX cycle length of the first DRX configuration and a period length of the data traffic pattern.

6. The method of claim 5, wherein said selecting the first DRX configuration is further based on an inactivity timer of the first DRX configuration.

7. The method of claim 1, wherein determining a data traffic pattern of an application executing on the UE comprises determining a data traffic pattern of a plurality of applications executing on the UE.

8. A wireless user equipment (UE), comprising:
an antenna;
a radio operably coupled to the antenna;
a memory medium; and
a processing element operably coupled to the radio and the memory medium;
wherein processing element is configured to execute program instructions stored on the memory medium to:
determine a data traffic pattern of an application executing on the UE;
compare a plurality of available discontinuous reception (DRX) parameters against the data traffic pattern of the application, wherein the plurality of DRX parameters are predefined by a base station (BS) in communication with the UE;
determine that the plurality of DRX parameters do not align with the data traffic pattern of the application;
select a first set of DRX parameters of the plurality of DRX parameters based on the data traffic pattern of the application;
perform communication with the BS according to the first set of DRX parameters using the radio and the antenna;
transmit a scheduling request (SR) outside of a DRX on duration according to the data traffic pattern of the application using the radio and the antenna, wherein said transmitting the SR is based on the plurality of DRX parameters not matching the data traffic pattern of the application; and
in response to transmitting the SR, receive downlink data of the application from the BS outside of DRX on durations specified by the first set of DRX parameters using the radio and the antenna.

9. The wireless UE of claim 8, wherein the processing element is further configured to:
transmit a plurality of SRs outside of a DRX on duration according to the data traffic pattern of the application, wherein said transmitting the plurality of SRs is based on the plurality of DRX parameters not matching the data traffic pattern of the application.

10. The wireless UE of claim 8, wherein the processing element is further configured to:
in response to transmitting of the SR, transmitting uplink data of the application to the BS.

11. The wireless UE of claim 8, wherein the application comprises a voice over internet protocol (VoIP) application.

12. The wireless UE of claim 8, wherein said selecting the first set of DRX parameters comprises selecting a DRX cycle length and inactivity timer based on the data traffic pattern of the application.

13. The wireless UE of claim 8,
wherein said determining the data traffic pattern of the application executing on the UE comprises determining a periodicity of data transmission and/or data reception; and
wherein said comparing the plurality of available DRX parameters against the data traffic pattern of the application comprises comparing the periodicity of the data transmission and/or data reception of the application with DRX cycle lengths of the plurality of available DRX parameters.

14. The wireless UE of claim 8, wherein determining a data traffic pattern of an application executing on the UE comprises determining a data traffic pattern of a plurality of applications executing on the UE.

15. An apparatus, comprising:
one or more processing elements, wherein the one or more processing elements are configured to cause a wireless device to:
determine a period length of data traffic of an application executing on the wireless device;
compare the period length of the application against a connected mode discontinuous reception (CDRX) cycle length of each of a plurality of CDRX configuration settings, wherein the plurality of CDRX configuration settings are associated with a base station (BS) in communication with the wireless device;
determine that the plurality of CDRX configuration settings do not match the period length of the data traffic of the application;
select a first CDRX configuration setting of the plurality of CDRX configuration settings based on the period length of the data traffic of the application and the CDRX cycle length of the first CDRX configuration setting;
perform communication with the BS according to the first CDRX configuration setting;
transmit a scheduling request (SR) outside of a CDRX on duration based on the period length of the data traffic of the application, wherein said transmitting the SR is based on the plurality of CDRX configuration settings not matching the period length of the data traffic of the application; and
in response to transmitting the SR, receive downlink data of the application from the BS.

16. The apparatus of claim 15, wherein said transmitting the SR comprises transmitting a plurality of SRs outside of CDRX on durations based on the period length of the data traffic of the application, wherein said transmitting the plurality of SRs is based on the CDRX configuration settings not matching the period length of the data traffic of the application.

17. The apparatus of claim 15, wherein the one or more processing elements are further configured to:
receive an uplink grant in response to transmitting the SR; and
transmit uplink data of the application to the BS based on the uplink grant outside of CDRX on durations of the first CDRX configuration setting.

18. The apparatus of claim 15, wherein the selecting the first CDRX configuration is based on the CDRX cycle length and inactivity timer.

19. The apparatus of claim 15, wherein said selecting the first CDRX configuration setting is further based on a data traffic pattern of the application and an inactivity timer of the first CDRX configuration setting.

20. The apparatus of claim 15, wherein the application comprises a streaming application.

* * * * *